United States Patent
Uchiumi et al.

(10) Patent No.: US 8,163,212 B2
(45) Date of Patent: Apr. 24, 2012

(54) PROCESS FOR PRODUCING PELLET OF ETHYLENE/VINYL ALCOHOL COPOLYMER

(75) Inventors: Naohiko Uchiumi, Okayama (JP); Noriyuki Kida, Okayama (JP); Hiroyuki Shimo, Pasadena, TX (US); Kaoru Ikeda, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 1358 days.

(21) Appl. No.: 10/521,468

(22) PCT Filed: Jul. 14, 2003

(86) PCT No.: PCT/JP03/08897
§ 371 (c)(1),
(2), (4) Date: Aug. 24, 2005

(87) PCT Pub. No.: WO2004/009313
PCT Pub. Date: Jan. 29, 2004

(65) Prior Publication Data
US 2006/0108703 A1     May 25, 2006

(30) Foreign Application Priority Data
Jul. 18, 2002   (JP) ................................ 2002-210194

(51) Int. Cl.
*B29B 9/06*     (2006.01)
(52) U.S. Cl. ............................ 264/85; 264/140; 264/233
(58) Field of Classification Search .................... 264/85, 264/82
See application file for complete search history.

(56) References Cited

U.S. PATENT DOCUMENTS

| 5,302,417 A * | 4/1994 | Yamauchi et al. ......... 427/385.5 |
| 6,838,029 B2 | 1/2005 | Kawahara et al. |
| 2002/0028871 A1* | 3/2002 | Kawahara et al. ............ 524/524 |

FOREIGN PATENT DOCUMENTS

| EP | 0 937 557 | 8/1999 |
| EP | 1 072 616 | 1/2001 |
| EP | 1072616 A2 * | 1/2001 |
| EP | 1 085 028 | 3/2001 |
| EP | 1085028 A1 * | 3/2001 |
| EP | 1 179 546 | 2/2002 |
| EP | 1179546 A1 * | 2/2002 |
| JP | 2001-011191 | 1/2001 |

OTHER PUBLICATIONS

U.S. Appl. No. 10/503,723, filed Aug. 6, 2004, Ikeda, et al.

* cited by examiner

*Primary Examiner* — Jeffrey T Barton
*Assistant Examiner* — Magali P Slawski
(74) *Attorney, Agent, or Firm* — Oblon, Spivak, McClelland, Maier & Neustadt, L.L.P.

(57) ABSTRACT

The present invention provides a process for producing pellet of EVOH comprising the steps of introducing an EVOH solution containing alcohol into an apparatus, contacting the solution with water in the apparatus to let out the alcohol with water and then letting out an EVOH hydrous composition from the above-mentioned apparatus (step 1); cutting the EVOH hydrous composition let out therefrom to obtain EVOH hydrous composition pellets (step 2); introducing the obtained EVOH hydrous composition pellets into a dryer to reduce a water content thereof (step 3); melt-kneading the pellets, whose water content is reduced, in an extruder (step 4); and cutting EVOH discharged from the extruder to obtain the pellet of EVOH (step 5). Thus, the EVOH hydrous composition obtained by removing alcohol without deteriorating the environment can be efficiently dried, and pellets having less thermal degradation in drying and a uniform shape can be obtained.

15 Claims, 4 Drawing Sheets

US 8,163,212 B2

PROCESS FOR PRODUCING PELLET OF ETHYLENE/VINYL ALCOHOL COPOLYMER

TECHNICAL FIELD

The present invention relates to a process for producing pellet of ethylene-vinyl alcohol copolymer (hereinafter referred to as "EVOH") and a process for producing EVOH resin.

BACKGROUND ART

EVOH is a useful polymeric material superior in oxygen barrier properties, flavor retentiveness, oil resistance, antistatic properties and mechanical strength, and has been widely used after molded into films, sheets and vessels. As a process for producing EVOH, it is general that an ethylene-vinyl ester copolymer obtained by copolymerizing ethylene and fatty vinyl ester such as vinyl acetate is saponified in an organic solvent containing alcohol in the presence of a saponification catalyst.

It is described in JP-A-90927/1999 (EP-A-937557) that a solution for strand production is prepared preferably by adding water to an alcoholic solution of EVOH obtained by saponification. It is also described therein that the concentration of EVOH in the EVOH solution thus obtained is preferably 15 to 55 weight % and the alcohol/water weight mixing ratio in the solution is preferably 9/1 to 3/7. A process is described in Example 1 thereof such that a methanol aqueous solution having a water content of 62.5 weight % is fed to a methanol solution of EVOH having a resin concentration of 30 weight % at the azeotropic conditions of a temperature of 100 to 110° C. and a pressure of 3 kg/cm$^2$G to distill methanol up to a resin concentration of 40 weight % and then obtain a fully clear methanol/water uniform solution.

However, when EVOH pellets are produced by a process of precipitating out of the EVOH solution containing large amounts of methanol in a coagulation bath, as described above, alcohol is occasionally volatilized off during the precipitation. The volatilization of alcohol not merely deteriorates the working environment to harm health of the workers but also adversely affects the peripheral environment; therefore, improvements have been sought.

A method for producing an EVOH hydrous composition is described in JP-A-121290/2002 (EP-A-1179546), which method is characterized by introducing an EVOH solution that contains at least 50 parts by weight, relative to 100 parts by weight of EVOH, of an alcohol having a boiling point of not higher than 100° C., into a vessel, and contacting the solution with water vapor in the vessel, thereby letting the alcohol out along with water vapor and then taking an EVOH hydrous composition that contains from 0 to 10 parts by weight of the alcohol and from 10 to 500 parts by weight of water, relative to 100 parts by weight of EVOH, out of the vessel. By this producing method, an EVOH hydrous composition that ensures efficient removal of alcohol not worsening the environment in and aroung working areas can be provided.

It is described in the publication that EVOH hydrous composition pellets are produced by cutting the obtained hydrous composition, and examples of a cutting process include a process of extruding into strands to coagulate and then cutting and a process of directly cutting in melt. It is described therein that the obtained pellets can be produced stably and have a high washing rate and a high drying rate. With regard to the drying, it is described therein that the EVOH pellets are generally dried to lower the water content thereof to at most 1% by weight.

A method of drying EVOH is described in JP-A-81197/2001 (EP-A-1085028), which method is characterized by melting and kneading EVOH with a water content of 5 to 60% by weight until the water content of less than 5% by weight. A process for producing EVOH pellets is described in examples of the publication such that hydrous composition pellets having a water content of 60% by weight, which are obtained by extruding an EVOH solution containing alcohol into a coagulation medium in a strand form for precipitation, thereafter cutting and washsing in water, are subjected to an adjustment of water to a water content of 25 weight % in a dryer and then projected into an extruder for drying up to a water content of 0.15 weight %.

As described in JP-A-90927/1999, however, in the case of washing and drying pellets obtained by cutting a precipitate out of an EVOH solution containing large amounts of methanol in a coagulation bath, there is the possibility that drying time becomes longer, so that not merely production efficiency is reduced but also resin during the drying is deteriorated.

In a process described in JP-A-121290/2002, drying time becomes shorter; however, as described in Example 1 of the publication, it takes 3 hours at a temperature of 100° C. to dry up to a water content of 0.2 weight %, and then further improvements have been desired in view of both production efficiency and the prevention of thermal degradation. In the case of pellets obtained by cutting an EVOH hydrous composition in a molten state, the shape thereof does not necessarily become uniform, and thus there is the possibility that extrusion stability is not sufficiently obtained in molding dried pellet products.

As a method described in JP-A-81197/2001, in the case of drying EVOH hydrous composition pellets having a high water content in an extruder, the total length (L/D) of the extruder is increased so that equipment costs are raised, and additionally thermal degradation is easily caused resulting from kneading time to be extended. On the occasion of melt-kneading an EVOH hydrous composition having a high water content, water is so easily separated from the EVOH that extrusion stability is reduced. Even if water content is previously reduced in a dryer before feeding into an extruder, drying rate in the dryer is not high, so that the problems are easily caused, such as the reduction of production efficiency and thermal degradation.

The present invention has been made to solve the above-mentioned problems and is intended to provide a process for producing EVOH pellets, such as to efficiently remove alcohol without deteriorating the working environment and peripheral environment, to efficiently remove water in the EVOH hydrous composition thus obtained and to obtain less thermal degradation in removing water and pellets having a uniform shape.

Another object of the present invention is to provide an environment-friendly process for producing EVOH resin, such as not to emit carboxylic acid such as acetic acid into the peripheral environment.

DETAILED DISCLOSURE OF THE INVENTION

The present application includes a first invention, a second invention and a third invention, which are greatly interrelated.

A first invention is a process for producing pellet of EVOH characterized by comprising the steps of:

introducing into an apparatus an EVOH solution containing 50 parts by weight or more of alcohol having a boiling point of 100° C. or less with respect to 100 parts by weight of EVOH, contacting the solution with water in the above-mentioned apparatus to let out the above-mentioned alcohol with water and then letting out from the above-mentioned apparatus an EVOH hydrous composition containing 0 to 10 parts by weight of the above-mentioned alcohol and 10 to 1000 parts by weight of water with respect to 100 parts by weight of EVOH (step 1);

cutting the EVOH hydrous composition let out from the above-mentioned apparatus in the step 1 to obtain EVOH hydrous composition pellets (step 2);

introducing the EVOH hydrous composition pellets obtained in the step 2 into a dryer to reduce a water content of the pellets (step 3);

melt-kneading the pellets, whose water content is reduced in the step 3, in an extruder (step 4); and cutting EVOH discharged from the extruder in the step 4 to obtain the pellet of EVOH (step 5).

By this producing process, alcohol can be efficiently removed without deteriorating the working environment and peripheral environment, water in the EVOH hydrous composition thus obtained can be efficiently removed, thermal degradation in removing water can become less and pellets having a uniform shape can be obtained.

In the case, it is preferable that an ethylene content in said EVOH is 3 to 70 mol % and a degree of saponification is 80 mol % or more. It is also preferable that said alcohol is methanol.

It is preferable that, in the step 1, the said EVOH solution is introduced into a vessel, the solution is contacted with water vapor in said vessel to let out said alcohol with water vapor, and then the EVOH hydrous composition is let out from said vessel. On that occasion, it is more preferable that the said EVOH solution is continuously introduced into a tower type vessel and contacted with water vapor in the vessel. In this case, it is particularly preferable embodiment that the said EVOH solution is introduced from an upper part of the tower type vessel, water vapor is introduced from a lower part of the tower type vessel, the said EVOH solution is countercurrently contacted with water vapor, thereafter said EVOH hydrous composition is let out from the lower part of the tower type vessel, and said alcohol is let out with water vapor from the upper part of the tower type vessel.

The EVOH hydrous composition is preferably cut in a molten state in the step 2. It is also preferable that said pellets obtained by cutting in the step 2 are immersed in a washing liquid to remove a saponification catalyst residue and then supplied to said dryer of the step 3. Further, it is also preferable that said pellets obtained by cutting in the step 2 are immersed in an aqueous solution containing at least one kind of additive selected from the group consisting of carboxylic acid, boron compound, phosphoric acid compound, alkali metal salt and alkaline earth metal salt to add said additive to the pellets, and then supplied to said dryer of the step 3.

It is preferable in the step 3 that the temperature of the pellets in said dryer is 40 to 150° C. and that the water content of the pellets is reduced to 10 weight % or less. It is preferable in the step 4 that the water content of EVOH discharged from the extruder after melt-kneading is 1 weight % or less and that water is removed from molten resin in said extruder. It is also preferable that at least one kind of additive selected from the group consisting of carboxylic acid, boron compound, phosphoric acid compound, alkali metal salt and alkaline earth metal salt is added in said extruder in the step 4. It is also preferable that said pellets obtained by cutting in the step 2 are immersed in an aqueous solution containing at least one kind of additive selected from the group consisting of carboxylic acid, boron compound, phosphoric acid compound, alkali metal salt and alkaline earth metal salt to add the above-mentioned additive to the pellets, and then supplied to said dryer of the step 3, and further at least one kind of additive selected from the group consisting of carboxylic acid, boron compound, phosphoric acid compound, alkali metal salt and alkaline earth metal salt is added in said extruder in the step 4. It is also preferable that EVOH discharged from the extruder is cut after cooling in the step 5.

A second invention is a process for producing an EVOH resin characterized by comprising the steps of:

introducing into an apparatus an EVOH solution containing 50 parts by weight or more of alcohol having a boiling point of 100° C. or less with respect to 100 parts by weight of EVOH, contacting the solution with water in said apparatus to let out said alcohol with water and then letting out from said apparatus an EVOH hydrous composition containing 0 to 10 parts by weight of the above-mentioned alcohol and 10 to 1000 parts by weight of water with respect to 100 parts by weight of EVOH; and contacting the above-mentioned EVOH hydrous composition with an aqueous solution containing carbon dioxide gas.

By the producing process, alcohol can be efficiently removed without deteriorating the working environment and peripheral environment, and an environment-friendly process for producing EVOH resin, such as not to emit carboxylic acid such as acetic acid into the peripheral environment, can be provided. By contacting with an aqueous solution containing carbon dioxide gas instead of carboxylic acid, a melt stability of the obtained EVOH resin is enhanced and a long-run workability is improved.

In this case, it is preferable that the ethylene-vinylalcohol copolymer hydrous composition let out from said apparatus is cut to obtain ethylene-vinylalcohol copolymer hydrous composition pellets, and then the ethylene-vinylalcohol copolymer hydrous composition pellets are contacted with said aqueous solution containing carbon dioxide gas. It is also preferable that said aqueous solution containing carbon dioxide gas further contains at least one kind of additive selected from the group consisting of boron compound, phosphoric acid compound, alkali metal salt and alkaline earth metal salt. It is also preferable that the producing process further comprises the step of melt-kneading the ethylene-vinylalcohol copolymer hydrous composition contacted with said aqueous solution containing carbon dioxide gas in an extruder.

A third invention is a process for producing an EVOH resin characterized by comprising the steps of:

contacting EVOH with an aqueous solution containing carbon dioxide gas; and melt-kneading EVOH contacted with said aqueous solution in an extruder.

Thus, provided is an environment-friendly process for producing EVOH resin, such as not to emit carboxylic acid such as acetic acid into the peripheral environment. By contacting with an aqueous solution containing carbon dioxide gas instead of carboxylic acid, a melt stability of the obtained EVOH resin is enhanced and a long-run workability is improved.

In this case, pellets comprising the ethylene-vinylalcohol copolymer are preferably contacted with said aqueous solution containing carbon dioxide gas. It is also preferable that the above-mentioned aqueous solution containing carbon dioxide gas further contains at least one kind of additive selected from the group consisting of boron compound, phosphoric acid compound, alkali metal salt and alkaline earth metal salt. It is also preferable that at least one kind of additive selected from the group consisting of boron compound, phosphoric acid compound, alkali metal salt and alkaline earth metal salt is added in said extruder. It is also preferable that the ethylene-vinylalcohol copolymer discharged from said extruder is cut to obtain ethylene-vinylalcohol copolymer pellets.

The present invention is hereinafter detailed.

A first invention relates to a process for producing pellet of EVOH comprising the steps of introducing an EVOH solution containing alcohol into an apparatus, contacting the solution with water in the apparatus to let out the alcohol with water and then letting out an EVOH hydrous composition from the above-mentioned apparatus (step 1); cutting the EVOH hydrous composition let out therefrom to obtain EVOH hydrous composition pellets (step 2); introducing the obtained EVOH hydrous composition pellets into a dryer to reduce a water content thereof (step 3); melt-kneading the pellets, whose water content is reduced, in an extruder (step 4); and cutting EVOH discharged from the extruder to obtain the pellet of EVOH (step 5).

EVOH used in the present invention is typically obtained by saponifying an ethylene-vinyl ester copolymer. The ethylene content is typically 3 to 70 mol %, preferably 10 to 60 mol % from the viewpoint of obtaining a molded article superior in gas barrier properties and melt moldability, more preferably 20 to 55 mol % and most preferably 25 to 55 mol %. In addition, a degree of saponification of a vinyl ester component is typically 80 mol % or more, preferably 95 mol % or more from the viewpoint of obtaining a molded article superior in gas barrier properties and particularly preferably 99 mol % or more. In the case of producing EVOH superior in melt stability and favorable in long-run workability, particularly, a degree of saponification of EVOH is preferably 99.7 mol % or more, more preferably 99.8 mol % or more, further more preferably 99.9 mol % or more and particularly preferably 99.95 mol % or more.

EVOH having an ethylene content of 3 to 20 mol % is preferably used as EVOH to which water-solubility is allowed, and such an EVOH aqueous solution is used as a coating material superior in barrier properties and film formability.

EVOH having a degree of saponification of 80 to 95 mol % is occasionally used for improving molding processability. Such EVOH may be singly used, and an embodiment such that the EVOH is blended with EVOH having a degree of saponification of more than 99 mol % is also preferable.

An ethylene content of less than 3 mol % in EVOH generally brings a poor melt moldability and causes the possibility of reducing water resistance, heat resistance and gas barrier properties at high humidities. An ethylene content of more than 70 mol %, meanwhile, frequently brings the shortage of barrier properties and printability. A degree of saponification of less than 80 mol % frequently brings unsatisfactory barrier properties, yellowing resistance and humidity resistance.

Other fatty vinyl esters (such as vinyl propionate and vinyl pivalate) can be also used together therewith on the occasion of copolymerizing ethylene and vinyl acetate. EVOH can contain a vinylsilane compound of 0.0002 to 0.2 mol % as a copolymerizaed component. Here, examples of a vinylsilane compound include vinyltrimethoxysilane, vinyltriethoxysilane, vinyltri(β-methoxy-ethoxy) silane and y-methacryloxypropyl methoxy silane. Among them, vinyltrimethoxysilane and vinyltriethoxysilane are preferably used.

A process for producing EVOH is specifically described hereinafter. The polymerization of ethylene and vinyl acetate is not limited to solution polymerization but may be any of solution polymerization, suspension polymerization, emulsion polymerization and bulk polymerization, and may be either of continuous system and batch system. The conditions of solution polymerization are as follows:

Solvent; preferably alcohols, and additionally an organic solvent (such as dimethyl sulfoxide) capable of dissolving ethylene, vinyl acetate and an ethylene-vinyl acetate copolymer can be used. Examples of alcohols to be used include methyl alcohol, ethyl alcohol, propyl alcohol, n-butyl alcohol and tert-butyl alcohol, particularly preferably methyl alcohol.

Catalyst; the following can be used: azonitrile-based initiators such as 2,2-azobisisobutyronitrile, 2,2-azobis-(2,4-dimethylvaleronitrile), 2,2-azobis-(4-methyl-2,4-dimethylvaleronitrile), 2,2-azobis-(4-methoxy-2,4-dimethylvaleronitrile) and 2,2-azobis-(2-cyclopropylpropionitrile), and organic peroxide-based initiators such as isobutyryl peroxide, cumyl peroxyneodecanoate, diisopropyl peroxycarbonate, di-n-propyl peroxydicarbonate, tert-butyl peroxyneodecanoate, lauroyl peroxide, benzoyl peroxide and tert-butyl hydroperoxide.

Temperature; 20 to 90° C., preferably 40 to 70° C.

Time (average residence time in the case of continuous system); 2 to 15 hours, preferably 3 to 11 hours Conversion; 10 to 90% with respect to charge vinyl ester, preferably 30 to 80%

Resin amount in a solution after polymerization; 5 to 85%, preferably 20 to 70%

Ethylene content in a copolymer; typically 3 to 70 mol %, preferably 10 to 60 mol %, more preferably 20 to 55 mol % and most preferably 25 to 55 mol %

Small amounts of the following monomers copolymerizable with ethylene and vinyl acetate can be made to coexist therewith: α-olefins such as propylene, isobutylene, α-octene and α-dodecene; unsaturated acids such as acrylic acid, methacrylic acid, crotonic acid, maleic acid and itaconic acid, anhydrides, salts, or mono- or dialkyl esters thereof; nitrites such as acrylonitrile and methacrylonitrile; amides such as acrylamide and methacrylamide; olefin sulfonic acids such as ethylene sulfonic acid, allyl sulfonic acid and metallyl sulfonic acid, or salts thereof; alkyl vinyl ethers, vinyl ketone, N-vinyl pyrrolidone, vinyl chloride, and vinylidene chloride.

After reaching predetermined time and conversion, a polymerization inhibitor is added as required, unreacted ethylene gas is evaporated out and thereafter unreacted vinyl acetate is removed. A process of removing unreacted vinyl acetate from an ethylene-vinyl acetate copolymer solution out of which ethylene is evaporated is, for example, a process of continuously supplying the copolymer solution at a constant rate through an upper part of a tower filled with Raschig ring, blowing in an organic solvent vapor such as methanol through a lower part of the tower, distilling out mixture vapor of the organic solvent such as methanol and unreacted vinyl acetate through the top of the tower, and taking out the copolymer solution from which the unreacted vinyl acetate is removed through the bottom of the tower.

An alkaline catalyst is added to the copolymer solution from which the unreacted vinyl acetate is removed to saponify a vinyl acetate component in the copolymer. A process of saponification can be either of continuous system and batch system. Sodium hydroxide, potassium hydroxide and alkali metal alcoholate are used as an alkaline catalyst. Methanol is preferable as a solvent used for saponifying. For example, the conditions of saponifying are as follows:

Concentration of the copolymer solution; 10 to 50%

Reaction temperature; 30 to 150° C.

Used amount of catalyst; 0.005 to 0.6 equivalent (per vinyl acetate component)

Time (average residence time in the case of continuous system); 10 minutes to 6 hours In the case of saponifying on continuous system, generally, methyl acetate produced by saponifying can be removed more efficiently, so that resin having a high degree of saponification is obtained by a smaller amount of catalyst as compared with the case of batch system. In the case of continuous system, saponification needs to be performed at higher temperatures in order to prevent the precipitation of EVOH produced by saponifying. Accordingly, on the continuous system, reaction temperature and amount of catalyst in the following ranges are preferable.

Reaction temperature; 70 to 150° C.

Used amount of catalyst; 0.005 to 0.1 equivalent (per vinyl acetate component)

A degree of saponification of the obtained EVOH varies with the purpose, preferably 80 mol % or more of a vinyl acetate component, more preferably 95 mol % or more, further more preferably 98 mol % or more and particularly preferably 99 mol % or more. A degree of saponification can be arbitrarily adjusted in accordance with the condition.

As described above, in the case of producing EVOH pellets superior in melt stability and favorable in long-run workability, particularly, a degree of saponification of EVOH is preferably 99.7 mol % or more, more preferably 99.8 mol % or more, further more preferably 99.9 mol % or more and particularly preferably 99.95 mol % or more. The conditions of saponifying are preferably adjusted further for obtaining such EVOH as follows:

As a process of obtaining EVOH having a high degree of saponification of 99.9 mol % or more, continuous system is preferable. Examples of a process of obtaining a high degree of saponification on continuous system include a process of adding a catalyst through plural spots of a saponification reaction tower, a process of increasing the used amount of a catalyst, and a process of increasing the amount of methanol blown in through a lower part of the saponification reaction tower. Examples of a process of obtaining EVOH having a high degree of saponification of 99.9 mol % or more on batch system include a process of adding a catalyst with division into plural times, a process of increasing the used amount of a catalyst, and a process of increasing the amount of methanol vapor or nitrogen gas blown into a saponification reaction vessel.

The EVOH solution thus obtained typically contains 50 parts by weight or more of alcohol having a boiling point of 100° C. or less with respect to 100 parts by weight of EVOH. The content of alcohol is preferably 70 parts by weight or more, more preferably 80 parts by weight or more, and meanwhile preferably 1000 parts by weight or less, more preferably 500 parts by weight or less. The content of alcohol in this range allows the fluidity of an EVOH solution to be secured and allows resin to be efficiently produced. Alcohol is preferably methanol.

The above-mentioned EVOH solution after saponifying may be not merely an alcoholic solution but also a solution of a mixed solvent to which another solvent such as water is added as required. Examples of a process of adding water include a process described in the JP-A-90927/2004.

A step 1 of the present invention is a step of introducing into an apparatus an EVOH solution containing 50 parts by weight or more of alcohol having a boiling point of 100° C. or less with respect to 100 parts by weight of EVOH obtained as described above, contacting the solution with water in the above-mentioned apparatus to let out the above-mentioned alcohol with water and then letting out from the above-mentioned apparatus an EVOH hydrous composition containing 0 to 10 parts by weight of the above-mentioned alcohol and 10 to 1000 parts by weight of water with respect to 100 parts by weight of EVOH.

The above-mentioned apparatus is not particularly limited but the solution may be contacted with water in a vessel or in a kneading apparatus such as an extruder. The contact with water in a vessel is preferable for treating in large amounts, particularly preferably the contact with water vapor.

That is to say, a preferable embodiment of a step 1 in the present invention is a step of introducing into a vessel an EVOH solution containing 50 parts by weight or more of alcohol having a boiling point of 100° C. or less with respect to 100 parts by weight of EVOH, contacting the solution with water vapor in the above-mentioned vessel to let out the above-mentioned alcohol with water vapor and then letting out from the above-mentioned vessel an EVOH hydrous composition containing 0 to 10 parts by weight of the above-mentioned alcohol and 10 to 1000 parts by weight of water with respect to 100 parts by weight of EVOH.

A process of contacting an EVOH solution introduced into a vessel with water vapor in the vessel is not particularly limited but may be either of continuous system and batch system. The form of a vessel also is not particularly limited; however, a tower type vessel and a bath type vessel are preferable in the case of continuous system and batch system, respectively. Continuous system is industrially preferable in consideration of production efficiency. Examples of a tower type vessel include plate towers such as a perforated plate tower and a bubble-cap tower, and a packed tower in which a ring type filler is put.

An EVOH solution and water vapor introduced into a vessel are preferably contacted countercurrently from the viewpoint of the efficiency of removing alcohol. Examples of a preferable embodiment include a process such that an EVOH solution is introduced from an upper part of a tower type vessel, water vapor is introduced from a lower part of the tower type vessel and countercurrently contacted with the above-mentioned solution, an EVOH hydrous composition is let out from the lower part of the tower type vessel, and alcohol is let out with water vapor from the upper part of the tower type vessel. Alcohol vapor and water vapor let out from the upper part of the tower type vessel can be condensed by a condenser and recovered as an alcohol aqueous solution, which is refined for reuse as required.

Too small amount of introduced water vapor brings a poor efficiency of removing alcohol, while too large amount thereof brings the disadvantage in view of costs, whereby the amount is preferably 0.3 to 30 times at a weight ratio with respect to the amount of an introduced EVOH solution, more preferably 0.5 to 10 times and further more preferably 0.7 to 5 times. Water vapor to be contacted with an EVOH solution may contain 10 parts by weight or less of alcohol with respect to 100 parts by weight thereof; however, it is preferable that water vapor does not contain alcohol therein in order to efficiently remove alcohol.

The temperature in a vessel is preferably 100 to 150° C. A temperature of less than 100° C. in a vessel may bring an insufficient fluidity of an EVOH hydrous composition and the possibility of causing gelation and blockade therein, which temperature is more preferably 110° C. or more, further more preferably 120° C. or more. A temperature of more than 150° C. in a vessel, meanwhile, occasionally may bring the deterioration of EVOH, which temperature is more preferably 140° C. or less.

When a pressure in a vessel is too low, the efficiency of removing alcohol may be poor, while the pressure is too high, the temperature of an EVOH solution therein may rise and the thermal degradation of EVOH is easily caused. Therefore, the pressure is preferably 1 to 6 kg/cm², more preferably 1.5 to 5 kg/cm² and further more preferably 2 to 4 kg/cm².

In this case, an EVOH solution contacts directly with water vapor in a vessel to gradually decrease the content of alcohol therein, and in the meantime EVOH is in the form of a swollen pasty and can be let out from the vessel without gelatinizing while retaining fluidity.

EVOH is dissolved under normal pressure, for example, in a mixed solvent of methanol/water at a temperature of approximately 60 to 70° C. and is not dissolved under normal pressure in a solvent comprising only water, though. It has, however, been found out that EVOH can retain fluidity in the presence of pressurized water vapor at a temperature of 100° C. or more even if EVOH substantially contains only water. As a result, it has been made easy to continuously treat by using a tower type vessel.

An EVOH hydrous composition let out from an apparatus contains 0 to 10 parts by weight of the above-mentioned alcohol and 10 to 1000 parts by weight of water with respect to 100 parts by weight of EVOH, and is let out from the vessel in a fluid state. The content of alcohol in an EVOH hydrous composition is preferably 0 to 5 parts by weight, more preferably 0 to 1 part by weight and furthermore preferably 0 to 0.1 part by weight. A low content of alcohol allows methanol to be prevented from volatilizing off in a post-step such as precipitation and allows the working environment and peripheral environment to be conserved. Pellets do not tend to stick together during the washing of a saponification catalyst residue even if the temperature of a washing liquid is raised, therefore washing temperature can be raised and consequently washing rate can be raised.

The content of water in an EVOH hydrous composition is 10 to 1000 parts by weight. When a content of water is less than 10 parts by weight, the fluidity in a vessel is insufficient. The content is preferably 30 parts by weight or more, more preferably 50 parts by weight or more. Meanwhile, when a content of water is more than 1000 parts by weight, it becomes difficult in stably precipitating in a strand state, and causes the problem such that pellets after cutting fuse and adhere mutually and become to have an inhomogeneous shape in the case of being cut in a molten state. The content is preferably 500 parts by weight or less, more preferably 200 parts by weight or less.

The EVOH hydrous composition thus obtained typically contains 0.1 to 5 weight % in terms of metal of alkali metal salt and additionally by-produced salts and other impurities.

The present invention comprises the step (step 2) of cutting the EVOH hydrous composition let out from the above-mentioned apparatus in the step 1 to obtain EVOH hydrous composition pellets. A process of cutting is not particularly limited. For examples, the EVOH hydrous composition may be directly cut in a molten state; or the EVOH hydrous composition in a molten state may be extruded into a coagulation liquid in a strand state, and the coagulate strands are cut.

In the case of directly cutting the EVOH hydrous composition in a molten state, as the examples of a process of cutting the EVOH hydrous composition let out from a vessel, a hot cutting system or an underwater cutting system is preferred. The bore diameter of a nozzle is preferably 2 to 5 mmφ (φ is a diameter, and so forth.) from the viewpoint of easiness of the handling of pellets. An example of a hot cutter to be employed in a hot cutting system is shown in FIG. 1. 1 is a feed opening of an EVOH hydrous composition, 2 is a die, 3 is a rotary blade, 4 is a rotation axis, 5 is a cutter box, 6 is a cooling water feed opening, 7 is cooling water, 8 is a water screen, 9 is a pellets take-out port, 10 is cooling water and pellets.

A large amount of water in an EVOH hydrous composition separates water from the EVOH hydrous composition, and the separated water is exhausted from a nozzle, so that a stable cut is occasionally made difficult. In the same manner as the case of cutting a strand, therefore, after previously decreasing water in EVOH by a kneader, an EVOH hydrous composition is preferably discharged from a nozzle and cut. Here, a kneader is of the kind composed of a cylinder provided with an take-out port of liquid and a screw mounted thereon.

With regard to a process of thus cutting in a molten state, as compared with a process of cutting a strand, it is not necessary to consider a take-off speed for stably forming a strand, leading to a superior productivity. Even in the case where a strand is not easily formed, such as EVOH having a low ethylene content, the cutting in a molten state allows EVOH hydrous composition pellets to be easily produced. Pellets cut in a molten state tend to be a somewhat nonuniform shape. However, in the steps 4 and 5 of the present invention, pellets are melt-kneaded in an extruder and then cut for pelletizing again. Therefore, pellets may be nonuniform at this stage, or rather pellets are preferably cut in a molten state, placing priority on productivity.

In the case of being extruded in a strand state and then being cut, an EVOH hydrous composition let out from a vessel is extruded into a coagulation liquid through a nozzle and made into a strand having a desirable diameter. In this case, when a water content of the EVOH hydrous composition is too high, water may separate from the EVOH hydrous composition and the separated water may be exhausted from a nozzle, so that it may be difficult to obtain a continuous strand. Therefore, it is preferable that after previously decreasing water in EVOH by a kneader, the EVOH hydrous composition is extruded through a nozzle and coagulated in a strand state.

Water is used for the above-mentioned coagulation liquid and a small amount of alcohol may be contained therein. With regard to a conventional process of extruding a methanol solution or a methanol/water mixed solution of EVOH into a coagulation liquid, in order to prevent a discharged strand from floating up in a coagulation bath before precipitating, it has been necessary to compound methanol with the coagulation liquid to decrease the specific gravity of the coagulation liquid; however, the present invention is superior in the conservation of the working environment and peripheral environment for the reason that a high rate of coagulation allows water not containing alcohol to be used in the coagulation bath.

The temperature of a coagulation liquid is preferably 0 to 50° C. and the temperature of an EVOH hydrous composition in a molten state during the extrusion is preferably 100 to 150° C. This temperature difference allows an EVOH hydrous composition to be coagulated in a short time. The temperature of a coagulation liquid is more preferably 0 to 30° C. and the temperature of an EVOH hydrous composition in a molten state is more preferably 110 to 140° C. A coagulated strand is cut by a cutter and made into pellets. A strand cutter is preferably used as a cutter.

The water content of the obtained EVOH hydrous composition pellets is preferably 20 to 50 weight %. Even if the water content is decreased by using a kneader, it is difficult to decrease to 20 weight % or less, which content is typically 25 weight % or more. The water content of more than 50 weight % brings the possibility of decreasing the efficiency of drying, which content is more preferably 45 weight % or less.

The EVOH hydrous composition pellets thus obtained typically contain alkali metal salt, for example, sodium acetate as a saponification catalyst residue to thereby cause the problem such as yellowing, and therefore are preferably immersed in a washing liquid to remove the saponification catalyst residue. EVOH hydrous composition pellets are favorable in washing efficiency by reason of having a porous shape. Therefore, it is preferable that a washing process is performed after the step 2 for the pellets, and then the pellets are subjected to processes of the step 3 and later. In the case of washing after processes of the step 3 or later, washing efficiency decreases. The content of alkali metal salt in hydrous pellets before washing is typically approximately 100 to 10000 µmol/g (per EVOH weight) in terms of alkali metal. A washing process is not particularly limited and a process of washing by water is preferable. Then, water to be used as a washing liquid may be aqueous solution of acid such as acetic acid for efficiently removing an alkali metal ion. The content of a saponification catalyst residue is also preferably decreased efficiently by using the washing by water and the washing by acid together.

The washing temperature is typically from 0 to 95° C. From the viewpoint of improving washing efficiency, the washing temperature is preferably higher. However, if too high, it may cause the fusion and adhesion of hydrous pellets. Therefore, too high washing temperature is not preferable. A lower limit of washing temperature is preferably 20° C. or more, while an upper limit thereof is preferably 70° C. or less.

The content of alkali metal in hydrous pellets after washing is preferably decreased to 0 to 50 µmol/g (per EVOH weight) in terms of alkali metal. An upper limit of the content of alkali metal is more preferably 40 µmol/g, further more preferably 30 µmol/g and particularly preferably 20 µmol/g.

A process of washing hydrous pellets is not particularly limited and either of a batch treatment vessel and a continuous treatment vessel can be used therefor. Above all, a process of continuously supplying and treating hydrous pellets in a tower type vessel is preferable from the viewpoint of productivity.

At least one kind of additive selected from the group consisting of carboxylic acid, boron compound, phosphoric acid compound, alkali metal salt and alkaline earth metal salt is preferably added to EVOH pellets in order to improve quality such as thermal stability.

Preferably, the above-mentioned additives are contained in EVOH pellets after a washing process, and then pellets are introduced into a dryer in the step 3. The containing of these additives before introducing into a dryer allows thermal degradation to be effectively prevented when heated in a dryer. In the case where a potassium salt is added as an additive, particularly, a metal ion is exchanged between the potassium salt and a sodium salt as a saponification catalyst residue remaining in EVOH pellets to efficiently remove the sodium salt in EVOH pellets, so that thermal degradation in a drying process and a melt-kneading process can be more effectively prevented. The EVOH hydrous composition pellets obtained in the step 2 are porous, so that the above-mentioned additives can be efficiently contained.

A process of adding the above-mentioned additives is not particularly limited and a publicly known process can be employed therefor. A process is preferable such that EVOH hydrous composition pellets are immersed in an aqueous solution containing the above-mentioned additives to adsorb these additives. With regard to these additives, kinds thereof, the content in EVOH, and the concentration in an aqueous solution in the case of immersing hydrous pellets in an aqueous solution containing the additives are described hereinafter.

Examples of carboxylic acid include oxalic acid, succinic acid, benzoic acid, citric acid, acetic acid, propionic acid and lactic acid. Among these, acetic acid is preferable in view of costs and availability. Too low content of carboxylic acid in EVOH pellets of the present invention after drying occasionally causes yellowing during the melt-molding, while too high content thereof occasionally brings an insufficient interlayer adhesiveness. Therefore, the content is preferably 0.1 to 50 µmol/g. A lower limit of the content of carboxylic acid is preferably 0.5 ∞mol/g or more, more preferably 0.8 µmol/g or more. An upper limit of the content of carboxylic acid is preferably 20 µmol/g or less, more preferably 10 µmol/g or less.

The concentration of carboxylic acid in an aqueous solution, in which EVOH hydrous composition pellets are immersed, is preferably 0.05 to 50 mmol/L for containing an appropriate amount of carboxylic acid in dry EVOH pellets. A lower limit of the concentration of carboxylic acid is more preferably 0.1 mmol/L or more, further more preferably 0.5 mmol/L or more. An upper limit thereof is more preferably 30 mmol/L or less, furthermore preferably15mmol/L or less. When a concentration is more than 50 mmol/L, EVOH may easily gelate to deteriorate the appearance of a molded article.

EVOH hydrous composition pellets can be contacted with an aqueous solution containing carbon dioxide gas instead of an aqueous solution containing carboxylic acid as described above. In that case, when hydrous pellets are dried after being contacted, carboxylic acid such as acetic acid is not emitted into the air and the peripheral environment and working environment are difficult to be adversely affected. In the present invention, EVOH hydrous composition pellets after being contacted with the aqueous solution are dried in a dryer in the step 3, and that the drying rate is high is one of the characteristics thereof. On the occasion of decreasing volatile water of EVOH hydrous composition pellets of the present invention, carboxylic acid such as acetic acid also is easily volatilized simultaneously. Thus, in the case where carboxylic acid is contained in EVOH hydrous composition pellets, there is the possibility that the control of the final content is made difficult. In view of both environmental protection and the control of the final content, it is preferable to contact with an aqueous solution containing carbon dioxide gas instead of an aqueous solution containing carboxylic acid in a producing process of the present invention.

In contacting with an aqueous solution containing carbon dioxide, the amount of carbon dioxide gas contained in the above-mentioned aqueous solution is not particularly limited and maybe properly adjusted. However, it is necessary to dissolve carbon dioxide in an amount more than the amount in which carbon dioxide gas contained in the air dissolves spontaneously. The concentration (a total of free carbon dioxide and carbonic acid) of carbon dioxide gas in an aqueous solution is preferably 0.5 mmol/L or more, more preferably 2 mmol/L or more and further more preferably 10 mmol/L or more. In order to increase the solubility of carbon dioxide gas, the treatment may be performed under the conditions of pressurizing at approximately 1.5 to 10 atm.

The pH of an aqueous solution containing the above-mentioned additives and carbon dioxide gas is preferably 3.5 to 6.5. The containing of a certain amount or more of carbon dioxide gas allows such an acidic aqueous solution. The value of pH is more preferably 3.8 or more, further more preferably 4 or more, and more preferably 6 or less, further more preferably 5.7 or less and most preferably 5.5 or less.

A process of preparing an aqueous solution containing the above-mentioned additives and carbon dioxide gas is not particularly limited. The above-mentioned additives may be added to an aqueous solution in which carbon dioxide gas is previously dissolved. On the contrary, carbon dioxide gas may be dissolved in an aqueous solution in which the above-mentioned additives are previously dissolved. Each of the solutions may be previously prepared and then mixed. In the case of using an aqueous solution containing carbon dioxide gas instead of carboxylic acid as described above, it is desirable that the above-mentioned aqueous solution does not contain carboxylic acid or a salt thereof.

In the case where EVOH hydrous composition pellets are contacted with an aqueous solution containing carbon dioxide gas, dry EVOH pellets to be obtained by a producing process of the present invention preferably contain 0 to 2 µmol/g of carboxylate radical (C1) which is extracted through an immersion treatment in water at a temperature of 95° C. for 10 hours. It is assumed that most of carboxylic acid and the salts thereof contained in EVOH resin are extracted through an immersion treatment in water at a temperature of 95° C. for 10 hours; therefore, carboxylate radical (C1) denotes a numerical value approximately corresponding to the total content thereof. In other words, EVOH pellets having an extremely low content of carboxylic acid and the salts thereof is preferable. The content of carboxylate radical (C1) is preferably 1.5 µmol/g or less, more preferably 1 µmol/g or less and further more preferably 0.5 µmol/g.

In this case, dry EVOH pellets to be obtained by a producing process of the present invention preferably contain 0 to 40 µmol/g of carboxylate radical (C2) which is extracted through an immersion treatment in a 0.05-N sodium hydroxide aqueous solution at a temperature of 95° C. for 10 hours. Through an immersion treatment in a 0.05-N sodium hydroxide aqueous solution at a temperature of 95° C. for 10 hours, most of carboxylic acid and the salts thereof contained in EVOH resin are not merely extracted but also saponification reaction proceeds at most of unsaponified carboxylic acid ester groups remaining in EVOH resin, and carboxylate radical as hydrolysate is liberated and extracted. In other words, EVOH pellets having a low total content of carboxylic acid, the salts thereof and carboxylic acid ester groups are preferable. The content of carboxylate radical (C2) is preferably 20 µmol/g or less, more preferably 10 µmol/g or less, furthermore preferably 5 µmol/g or less and most preferably 2 µmol/g or less.

In melt-molding EVOH resin composition, the temperature typically reaches 200° C. or more, at which temperature many chemical reactions can proceed. It is thought that carboxylic acid ester groups contained in EVOH resin are hydrolyzed by reacting with water to liberate carboxylic acid or undergo transesterification with carboxylic acid or the salts thereof. It is also thought that carboxylic acid or the salts thereof reacts with hydroxyl groups of EVOH to form carboxylic acid ester groups or undergo transesterification with carboxylic acid ester groups. In other words, in melt-molding, particularly, melt-molding for a long time, chemical reactions which occurs within molten resin during such a melting by heating can not be disregarded.

An aqueous solution containing carbon dioxide gas instead of carboxylic acid is used by reason of focusing attention on this point, and the improvement of melt stability and the prevention of odor generation in EVOH resin are intended to be achieved by the total content of carboxylic acid, the salts thereof and carboxylic acid ester groups, which can be converted reciprocally. EVOH pellets having extremely superior long-run workability can be provided by extremely decreasing the amount of carboxylate radical (C1) which was originally and still is liberated and which is extracted through an immersion treatment in water at a temperature of 95° C. for 10 hours, and decreasing to a certain value or less the amount of carboxylate radical (C2), as an amount including liberatable group under the conditions of heating and melting, which is extracted through an immersion treatment in a 0.05-N sodium hydroxide aqueous solution at a temperature of 95° C. for 10 hours.

EVOH pellets to be obtained by a producing process of the present invention preferably contain alkali metal salt in view of securing interlayer adhesiveness and long-run workability. The kind of cations of alkali metal salt is not particularly limited, which salt is selected from lithium salt, sodium salt, potassium salt, rubidium salt and cesium salt, and sodium salt and potassium salt are preferable, in particular, potassium salt is preferable. The use of potassium salt allows EVOH pellets superior in both interlayer adhesiveness and long-run workability. The kind of anions of alkali metal salt also is not particularly limited, which salt can be added as carbonate, hydrogencarbonate, phosphate, hydrogenphosphate, hydroxide and carboxylate, and is preferably added as carbonate, hydrogencarbonate and hydroxide among them, also preferably added as borate as described later.

The content of alkali metal salt in EVOH pellets after drying is preferably 0.1 to 20 µmol/g in terms of alkali metal. The containing of alkali metal salt improves interlayer adhesiveness, yellowing resistance and long-run workability during the melting. The content of less than 0.1 µmol/g occasionally brings insufficient interlayer adhesiveness, yellowing resistance and long-run workability during the melting, while the content of more than 20 µmol/g occasionally brings an insufficient yellowing resistance during the melting. Yellowing resistance and long-run workability during the melting are comparatively favorable in a range of 0.1 to 0.3 µmol/g, and in the case of using in a multilayer constitution with other resin, use of a normal acid anhydride-modified adhesive resin may achieve an insufficient adhesive strength. A lower limit of the content of alkali metal salt is more preferably 0.3 µmol/g or more, further more preferably 0.5 µmol/g or more. An upper limit of the content of alkali metal salt is more preferably 15 µmol/g or less, further more preferably 10 µmol/g or less and particularly preferably 8 µmol/g or less.

A preferable range of the content of alkali metal salt in an aqueous solution in which EVOH hydrous composition pellets are immersed is affected by the water content of hydrous pellets, being generally preferably 0.05 to 40 mmol/L. A lower limit of the content of alkali metal salt in the above-mentioned aqueous solution is more preferably 0.1 mmol/L. An upper limit thereof is more preferably 20 mmol/L.

EVOH pellets to be obtained by a producing process of the present invention preferably contain a boron compound in view of further improving long-run workability during the melt-molding. Examples of a boron compound include boric acids, boric acid ester, borate and potassium borohydrides, and is not limited thereto. Specifically, examples of boric acids include orthoboric acid, metaboric acid and tetraboric acid, examples of boric acid ester include triethyl borate and trimethyl borate, and examples of borate include alkali metal salt and alkaline earth metal salt of the above-mentioned various boric acids and borax. Orthoboric acid (hereinafter occasionally denoted as merely boric acid) is preferable among these compounds.

With regard to the content of a boron compound in EVOH pellets after drying, if the content is too low, the effect of improving thermal stability may decrease. And if the content is too high, the gelation and poor moldability may be caused. Therefore, the content thereof is preferably 1 to 200 µmol/g in terms of boron element, more preferably 2 µmol/g or more and further more preferably 3 µmol/g or more, and more preferably 150 µmol/g or less and further more preferably 100 µmol/g or less.

The concentration of a boron compound in an aqueous solution in which EVOH hydrous composition pellets are immersed is preferably 0.1 to 50 mmol/L in terms of boron element for containing an appropriate amount of a boron compound in dry EVOH pellets. A lower limit of the concentration of a boron compound is more preferably 0.5 mmol/L or more, further more preferably 1 mmol/L or more. An upper limit thereof is more preferably 40 mmol/L or less, further more preferably 30 mmol/L or less. If the concentration exceeds 50 mmol/L, EVOH is liable to gelate and the appearance of a molded article may deteriorate.

EVOH pellets to be obtained by a producing process of the present invention also preferably contain a phosphoric acid compound. An addition of an appropriate amount thereof may make it possible to inhibit the yellowing of a molded article and the generation of gels and hard spots during the melt-molding of EVOH pellets to be obtained. Examples of a phosphoric acid compound include various acids such as phosphoric acid and phosphorous acid, and salts thereof. Any of monophosphate, diphosphate and triphosphate may be contained as phosphate, and the kind of cations thereof is not particularly limited; however, alkali metal salt is preferable. Among them, a phosphoric acid compound is preferably added in the form of sodium dihydrogen phosphate, potassium dihydrogen phosphate, disodium hydrogen phosphate and dipotassium hydrogen phosphate.

A phosphoric acid compound is arbitrarily added, and the content of a phosphoric acid compound in EVOH pellets after drying is preferably 0 to 5 µmol/g in terms of phosphate radical. That is, the content (D1) of phosphate radical is preferably 5 µmol/g or less, more preferably 4 µmol/g or less, furthermore preferably 3 µmol/g or less and most preferably 1.5 µmol/g or less, while the content (D1) of phosphate radical is preferably 0.05 µmol/g or more, more preferably 0.1 µmol/g or more, further more preferably 0.15 µmol/g or more and most preferably 0.2 µmol/g or more. The concentration of a phosphoric acid compound to be added in an aqueous solution in which hydrous pellets are immersed is appropriately in a range of 0 to 10 mmol/L in terms of phosphate radical, more preferably in a range of 0 to 5 mmol/L.

In the case where EVOH hydrous composition pellets are contacted with an aqueous solution containing carbon dioxide gas and a phosphoric acid compound is added thereto, the ratio (D1/D2) of the content (D1: µmol/g) of phosphate radical in terms of phosphate radical to the content (D2: µmol/g) of phosphorus element is preferably 0.4 or less in a melt-molded article to be obtained by melt-molding EVOH pellets produced in the present invention.

Here, the content (D1) of phosphate radical is the amount of a phosphoric acid compound to be extracted by immersing a melt-molded article in an aqueous solution. That is, the content (D1) denotes the amount of a phosphoric acid compound extractable from an aqueous solution, which is contained in a resin composition as a phosphoric acid or a salt thereof. Meanwhile, the content (D2) of phosphorus element is, for example, a value to be obtained by performing emission spectral analysis for the amount of phosphorus element contained in an aqueous solution in which the ash content resulting from complete combustion of a melt-molded article is dissolved. That is, the content (D2) determines the amount of total phosphorus elements contained in a melt-molded article as well as a phosphoric acid compound to be extracted through an extraction treatment from an aqueous solution. Accordingly, the fact that the ratio (D1/D2) of 0.4 or less signifies that not less than half of total phosphorus elements contained in the melt-molded article are contained in the unextractable form.

Up to date, it has been reported that in the case of making a phosphoric acid compound be contained in EVOH, a phosphoric acid compound contained in a resin composition can be extracted in the approximately total amount, and most of the phosphoric acid compound can be extracted even after melt-molding EVOH. The ratio (D1/D2), therefore, denotes a value of approximately 1 even after melt-molding. On the contrary, when a resin composition to be obtained by contacting with an aqueous solution containing carbon dioxide gas and adding a phosphoric acid compound thereto is immersed in an aqueous solution to contain a phosphoric acid compound and then only dried, it is possible to extract approximately all the compound, whereas when further heated in a molten state, it will become impossible to extract that compound.

It is not necessarily obvious that in what chemical structure the phosphorus element contained in a melt-molded article of the present invention exists. However, it is presumed that a phosphoric acid compound reacts with a hydroxyl group of EVOH to form a phosphoric ester. It is presumed that fixing a phosphoric acid compound in a molecular chain of EVOH is preventing the compound from being extracted. It is thought that such a resin composition might be obtained by immersing in an aqueous solution containing carbon dioxide gas instead of an aqueous solution containing carboxylic acid such as acetic acid.

A melt-molded article having a ratio thus obtained (D1/D2) of 0.4 or less is superior in long-run workability. It is also thought that phosphorus element presumed to be fixed in a molecular chain of EVOH contributes to thermal stability. The ratio (D1/D2) is preferably 0.35 or less, more preferably 0.3 or less, further more preferably 0.25 or less and most preferably 0.2 or less.

Then, a preferable range of the content (D2) of phosphorus element is the same as that of the content (D1) of phosphate radical before melt-molding. The reason therefor is that the content (D2) of phosphorus element does not substantially change before and after melt-molding. The content (D2) of phosphorus element is preferably 5 µmol/g or less, more preferably 4 µmol/g or less, further more preferably 3 µmol/g or less and most preferably 1.5 µmol/g or less, while the content (D2) of phosphorus element is preferably 0.05 µmol/g or more, more preferably 0.1 µmol/g or more, further more preferably 0.15 µmol/g or more and most preferably 0.2 µmol/g or more.

EVOH pellets to be obtained by a producing process of the present invention may contain alkaline earth metal salt. Depending on uses, an addition of an appropriate amount thereof occasionally allows long-run workability to be improved during the melt-molding of EVOH pellets to be obtained. In the case where EVOH hydrous composition pellets are contacted with an aqueous solution containing carbon dioxide gas instead of carboxylic acid, however, the addition of a large amount of alkaline earth metal salt is not appropriate by reason of easily forming hardly soluble carbonate.

The kind of cations of alkaline earth metal salt is not particularly limited, examples of which salt include magnesium salt, calcium salt, barium salt and strontium salt, and magnesium salt and calcium salt are preferable. The kind of anions of alkaline earth metal salt also is not particularly limited, which salt can be added as carbonate, hydrogencarbonate, phosphate, hydrogenphosphate, hydroxide and carboxylate, and is preferably added as carboxylate in the case where an aqueous solution contains carboxylic acid and meanwhile is preferably added as carbonate, hydrogencarbonate and hydroxide in the case where an aqueous solution contains carbon dioxide gas.

Alkaline earth metal salt is arbitrarily added, and the content of alkaline earth metal salt in EVOH pellets after drying is preferably 0 to 10 μmol/g in terms of alkaline earth metal, more preferably 5 μmol/g or less and further more preferably 3 μmol/g or less. In the case of seriously considering the restraint of yellowing during the melt-molding, particularly, the content of alkaline earth metal salt is more preferably 2 μmol/g or less, further more preferably 1 μmol/g or less, and it is preferable that alkaline earth metal salt is not substantially contained.

In case of adding alkaline earth metal salt, the concentration thereof in an aqueous solution in which hydrous pellets are immersed is preferably in a range of 0 to 10 mmol/L in terms of alkaline earth metal for containing alkaline earth metal salt in dry EVOH pellets. An upper limit thereof is more preferably 5 mmol/L or less, further more preferably 3 mmol/L or less.

The temperature of the above-mentioned aqueous solution contacted with EVOH hydrous composition pellets is not particularly limited, preferably 10 to 90° C. A temperature of less than 10° C. brings the possibility of taking time to allow additives to be uniformly contained in hydrous pellets, while a temperature of more than 90° C. brings the possibility of causing the fusion and adhesion of hydrous pellets. In the case of being immersed in an aqueous solution containing carbon dioxide gas, particularly, saturated solubility thereof is decreased and thus it is occasionally difficult that a sufficient amount of carbon dioxide gas is contained in the above-mentioned solution. The temperature of the above-mentioned aqueous solution is more preferably 20° C. or more, further more preferably 30° C. or more, and more preferably 85° C. or less, further more preferably 80° C. or less. In the case of being immersed in an aqueous solution containing carbon dioxide gas, the solubility of carbon dioxide gas is decreased in contacting at higher temperatures than 70° C., so that it is preferable to contact under a pressurization of approximately 1.5 to 10 atmospheric pressures.

The time for contacting EVOH hydrous composition pellets with the above-mentioned aqueous solution varies in a preferable range thereof with the form of hydrous pellets, preferably 1 hour or more in the case of hydrous pellets of approximately 1 to 10 mm, more preferably 2 hours or more.

A process of contacting EVOH hydrous composition pellets with the above-mentioned aqueous solution is not particularly limited. Hydrous pellets are previously contacted with water and then carbon dioxide gas and additives can be dissolved in water later, and a process of contacting hydrous pellets with an aqueous solution adjusted by previously dissolving these therein is preferable by reason of obtaining EVOH pellets of stable quality, which uniformly contain additives.

A process of contacting EVOH hydrous composition pellets with the above-mentioned aqueous solution can be either of batch system and continuous system. With regard to continuous system, preferable examples of the process include a process of contacting hydrous pellets with an aqueous solution to be continuously supplied while gradually moving the pellets downward in a tower type vessel. Plural aqueous solutions may be prepared and contacted with division into plural times.

A process of adding the above-mentioned additives is not performed in this step but the additives can be added in an extruder in the step 4. A process of adding a specific component is performed in this step and additionally another component can be added in an extruder in the step 4. A process of adding in the step 4 is described later.

Thus, EVOH hydrous composition pellets obtained through a process of washing and/or a process of adding additives as required are introduced into a dryer in the step 3. EVOH hydrous composition pellets obtained in the step 2 are porous and have a high drying rate, and thereby can be dried at a low drying temperature as well as in a short time.

The water content of EVOH hydrous composition pellets when introduced into a dryer is preferably 20 to 50 weight %. It is difficult to decrease to less than 20 weight % even if the water content is decreased by using a kneader, which content is typically 25 weight % or more. A water content of more than 50 weight % brings the possibility of decreasing the efficiency of drying, which content is preferably 45 weight % or less.

The water content of pellets after decreasing the water content in the step 3 is preferably 10 weight % or less. A water content of more than 10 weight % brings the further decrease of the water content in the step 4, in which case both the residence time and the length (L/D) of an extruder become so longer that equipment costs are increased. The water content after the step 3 is more preferably 7 weight % or less, further more preferably 5 weight % or less. In the case of drying to a water content of less than 0.1 weight %, meanwhile, the duration of the step 3 becomes so longer that production rate is decreased and there is the possibility of causing thermal degradation of EVOH in drying at high temperatures. The water content after the step 3 is more preferably 0.3 weight % or more.

In the case where the water content of pellets after decreasing the water content in the step 3 is set at 1 to 10 weight %, preferably 2 to 10 weight %, the water content typically needs to be further decreased in the step 4; however, it is preferable that the duration of the step 3 becomes so shorter that production efficiency is improved and thermal degradation in the step 3 can be prevented. Meanwhile, in the case where the water content of pellets after decreasing the water content in the step 3 is set at 0.1 to 1 weight %, preferably 0.1 to 0.8 weight %, the duration of the step 3 occasionally becomes longer; however, it is preferable that the water content needs less to be further decreased in the step 4 so that an extruder to be used in the step 4 can cost less. With regard to these embodiments, more appropriate one thereof can be properly selected in accordance with the situations.

A dryer to be used in the step 3 is not particularly limited and a hot air dryer can be used. A dryer may be a fluid type dryer or a still-standing type dryer, and a combination thereof may be used. For example, a process of initially drying by a fluidized drying process and subsequently drying by a still-standing drying process can be adopted.

Drying temperature in the step 3 is not particularly limited and the drying is preferably performed at a temperature of 40 to 150° C. for 0.1 to 15 hours. EVOH hydrous composition pellets obtained in the step 2 can be promptly dried even at low temperatures and thermal degradation thereof can be restrained. Drying temperature is more preferably 120° C. or less, further more preferably 100° C. or less and most preferably 90° C. or less. Drying time varies with drying temperature and intended water amount, more preferably 0.5 hour or more, further more preferably 1 hour or more, and more preferably 5 hours or less, further more preferably 3 hours or less. The drying may be performed in the air or in inert gas such as nitrogen. In the case of drying in inert gas, thermal degradation does not tend to occur even if drying temperature is set to be higher.

Pellets whose water content is reduced in the step 3 are fed into an extruder and subjected to the step of melt-kneading in an extruder (step 4). The step 4 is described hereinafter. The kind of an extruder to be used is not particularly limited and may be a single screw extruder or twin screw extruder. A twin screw extruder is preferably used in the case of removing a certain amount or more of water, such as 1 weight % or more of water, in the step 4. Then, it is more preferable to use a twin screw extruder such that the directions of rotation of screw are the same and a twin screw extruder having L/D of 15 or more. A block cylinder is preferable as a cylinder. A segment type screw is preferable as a screw. The above-mentioned twin screw extruder is preferably used also in the case of adding at least one kind of additive selected from the group consisting of carboxylic acid, boron compound, phosphoric acid compound, alkali metal salt and alkaline earth metal salt in the step 4. On the contrary, when water amount needs less to be decreased in the step 4, such as less than 1 weight % of water amount to be removed, a single screw extruder is preferably used. In this case, an apparatus with low equipment costs allows the form of pellets to be made even.

Pellets can be introduced into an extruder through a hopper, and the inside of an extruder is preferably retained in an inert atmosphere by feeding pellets thereinto while blowing inert gas into a hopper. This allows EVOH during the melt-kneading to be restrained from deteriorating. For example, when the obtained EVOH pellets is subjected to extrusion molding for producing a film, resin adheres less to a die and the pellets are superior in extrusion stability and long-run workability. And defects in the obtained film such as gel-like hard spots and fish eyes can be decreased and the film can be restrained from yellowing.

The water content of EVOH pellets before being introduced into an extruder in the step 4 is preferably 0.1 to 10 weight % as described in the step 3. The water content of EVOH pellets discharged from an extruder in the step 4 is preferably 1 weight % or less, more preferably 0.5 weight % or less and further more preferably 0.3 weight % or less. In view of efficiently drying by both of the step 3 and the step 4, it is preferable that water is removed from molten resin in the step 4. The water content is preferably decreased by 0.1 weight % or more before and after the step 4, more preferably 0.3 weight % or more and further more preferably 1 weight % or more.

In the case where the water content of EVOH pellets to be introduced into an extruder is 1 to 10 weight %, a certain amount of water needs to be removed in the step 4 and an apparatus for dewatering such as a vent frequently needs to be attached in an extruder. Meanwhile, in the case where the water content of EVOH pellets to be introduced into an extruder is 0.1 to 1 weight %, occasionally water need not be removed in the step 4, in which case an apparatus for dewatering such as a vent port is occasionally unnecessary in an extruder. Examples of a vent port include a vacuum vent for removing water vapor under a reduced pressure and an open vent for removing water vapor under normal pressure.

The resin temperature in an extruder in the step 4 varies with the ethylene content in EVOH, preferably 130 to 270° C. When a resin temperature is less than 130° C., EVOH resin may be not completely melted. A resin temperature is preferably 160° C. or more, more preferably 180° C. or more. When a resin temperature is more than 270° C., EVOH may be easily subject to thermal degradation. A resin temperature is preferably 250° C. or less, more preferably 240° C. or less. A process of adjusting such resin temperature is not particularly limited, and a process of appropriately setting the temperature of an extruder cylinder is particularly preferable. Here, resin temperature signifies a temperature detected by a temperature sensor installed in an extruder cylinder, and a detecting spot is in the vicinity of a discharge slot at the head of an extruder.

At least one kind of additive selected from the group consisting of carboxylic acid, boron compound, phosphoric acid compound, alkali metal salt and alkaline earth metal salt can be also added in an extruder in the step 4. The above-mentioned additives can be added each singly and a plurality thereof may be simultaneously added in accordance with embodiments. Addition effect and preferable added amount of each of these components are the same as already described in the treatment of EVOH hydrous composition pellets obtained in the step 2.

The addition mode of the above-mentioned additives is not particularly limited in the step 4. Examples of an addition mode include a process of adding as dry powders in an extruder, a process of adding in a pasty state such that a solvent is impregnated, a process of adding in a state such as to be suspended in a liquid and a process of adding as a solution for dissolving in a solvent, and a process of adding as a solution such that the above-mentioned additives are dissolved in a solvent is particularly preferable from the viewpoint of controlling the added amount and homogeneously dispersing the above-mentioned additives into EVOH resin. Such a solvent is not particularly limited, preferably water from the viewpoint of the solubility of the above-mentioned additives, the merit in costs, the easiness of handling and the safety of working environment. With regard to a process of adding, the above-mentioned additives are preferably added to an extruder through one spot, or two spots or more.

A process of adding the above-mentioned additives may be a process of contacting hydrous composition pellets obtained in the step 2 with an aqueous solution as described above or a process of adding in an extruder in the step 4. After contacting pellets obtained in the step 2 with an aqueous solution to add specific additives, other additives are preferably further added in an extruder in the step 4.

A process of contacting pellets obtained in the step 2 with an aqueous solution to add additives is superior in dispersibility of additives into pellets. The addition of a potassium salt by this process allows a sodium salt as a saponification catalyst residue to be efficiently removed from pellets. The added amount, however, is not necessarily controlled easily in this process, which requires the wastewater treatment of an aqueous solution after use. On the other hand, a process of adding in an extruder in the step 4 does not require an aqueous solution bath, in which process the added amount is easily controlled. The addition of boric acid, however, occasionally deteriorates dispersibility. An appropriate process of adding, therefore, needs to be selected in accordance with the properties of additives and the performances required for EVOH pellets to be produced.

A process of pelletizing EVOH resin discharged from an extruder in the step 5 is not particularly limited, and examples of a process of pelletizing include a process of extruding the above-mentioned resin from die in a strand state to cool and then cut in an appropriate length. A process of cooling is not particularly limited, and examples include a process of contacting with a low-temperature liquid such as water for a short time and a process of blowing over cold blast. In the case of contacting with water to cut, it is occasionally preferable to perform a process of removing water adhering on a surface of pellets after being cut, which process may be the removal of water of adhesion by air blow or the drying in a dryer for a short time. From the viewpoint of the easiness of handling of pellets, it is preferable that the bore diameter of die is 2 to 5 mm$\phi$ and a strand is cut in a length of approximately 1 to 5 mm. Thus, pellets having a uniform shape can be obtained, leading to superiority in extrusion stability during various molding. The cutting system in a molten state such as a hot cutting system or an underwater cutting system can be adopted.

EVOH pellets obtained by the above-mentioned process can be blended with EVOH having different degree of polymerization, ethylene content and degree of saponification and then melt-molded. The following can be added in proper amounts to the pellets: other various plasticizers, lubricants, stabilizers, surfactants, coloring agents, ultraviolet absorbing agents, antistatic agents, desiccants, crosslinking agents, metal salts, fillers and reinforcing agents such as various fibers.

The EVOH pellets thus obtained are molded by melt-molding into various molded articles such as films, sheets, vessels, pipes and fibers, and used for various uses of packaging. EVOH pellets to be obtained in the present invention are hardly subject to thermal degradation, so that molded articles having less yellowing can be obtained. Among them, films are frequently molded for a long time, and gels and hard spots in long-run molding easily become apparent as the problem in appearance, so that EVOH pellets of the present invention are appropriately used therefor.

The second invention is a process for producing an EVOH resin characterized by comprising the steps of:

introducing into an apparatus an EVOH solution containing 50 parts by weight or more of alcohol having a boiling point of 100° C. or less with respect to 100 parts by weight of EVOH, contacting the solution with water in the above-mentioned apparatus to let out the above-mentioned alcohol with water and then letting out from the above-mentioned apparatus an EVOH hydrous composition containing 0 to 10 parts by weight of the above-mentioned alcohol and 10 to 1000 parts by weight of water with respect to 100 parts by weight of EVOH; and contacting the above-mentioned EVOH hydrous composition with an aqueous solution containing carbon dioxide gas.

In such a process for producing an EVOH resin, alcohol can be removed from an EVOH solution without volatilizing alcohol in the working environment and peripheral environment, and EVOH pellets can be dried without volatilizing carboxylic acid in the working environment and peripheral environment. That is to say, an environment-friendly process for producing EVOH resin can be provided. The contact with an aqueous solution containing carbon dioxide gas instead of carboxylic acid improves melt stability and long-run workability of the obtained EVOH resin.

The composition and producing process of EVOH in a second invention are the same as a first invention. In the step of introducing into an apparatus an EVOH solution containing 50 parts by weight or more of alcohol having a boiling point of 100° C. or less with respect to 100 parts by weight of EVOH, contacting the solution with water in the above-mentioned apparatus to let out the above-mentioned alcohol with water and then letting out from the above-mentioned apparatus an EVOH hydrous composition containing 0 to 10 parts by weight of the above-mentioned alcohol and 10 to 1000 parts by weight of water with respect to 100 parts by weight of EVOH, the same process as the step 1 in a first invention can be adopted.

A process of contacting the EVOH hydrous composition thus obtained with an aqueous solution containing carbon dioxide gas is not particularly limited. Similarly to a first invention, an EVOH hydrous composition may be cut to obtain EVOH pellets, which is then contacted with an aqueous solution containing carbon dioxide gas, or may be contacted therewith in a molten state, such as in an extruder, without pelletizing. Similarly to the step 2 of a first invention, typically, it is preferable that an EVOH hydrous composition let out from the above-mentioned apparatus is cut to obtain EVOH hydrous composition pellets, which is then contacted with an aqueous solution containing carbon dioxide gas.

It is also preferable that an aqueous solution containing carbon dioxide gas further contains at least one kind of additive selected from the group consisting of boron compound, phosphoric acid compound, alkali metal salt and alkaline earth metal salt. Thus, various effects of adding these kinds of additives can be obtained. Kinds, adding processes or added amounts of these additives are the same as described in a first invention. However, it is preferable that carboxylic acid is not contained for producing an effect of a second invention such that carboxylic acid is not volatilized in the working environment and peripheral environment, which the second invention differs in this point from the first invention.

After being contacted with an aqueous solution containing carbon dioxide gas, an EVOH hydrous composition may be dried in a dryer by a process as described in the step 3 of a first invention. The EVOH hydrous composition is dried therein to a water content of 1 weight % or less to obtain dry EVOH pellets, which may be directly subjected to various processes of molding or may be further melt-kneaded and then pelletized.

The above-mentioned EVOH hydrous composition contacted with an aqueous solution containing carbon dioxide gas is preferably dried as required and then melt-kneaded in an extruder. A process of melt-kneading in this case is the same as described in the step 4 of a first invention. Accordingly, at least one kind of additive selected from the group consisting of boron compound, phosphoric acid compound, alkali metal salt and alkaline earth metal salt can be also added in an extruder; however, it is preferable that carboxylic acid is not added.

After melt-kneading, EVOH discharged from an extruder is preferably cut to obtain EVOH pellets. A process of pelletizing in this case is the same as described in the step 5 of a first invention.

The uses of the obtained EVOH pellets are the same as described in a first invention.

The third invention is a process for producing an EVOH resin characterized by comprising the steps of:

contacting EVOH with an aqueous solution containing carbon dioxide gas; and melt-kneading EVOH contacted with the above-mentioned aqueous solution in an extruder.

In such a process for producing an EVOH resin, EVOH is contacted with an aqueous solution containing carbon dioxide gas instead of an aqueous solution containing carboxylic acid, so that carboxylic acid is not volatilized in thereafter melt-kneading in an extruder. This allows a process for producing an EVOH resin to be provided such that resin quality is prevented from deteriorating due to fluctuations of carboxylic acid content and a load on the peripheral environment is light. The contact with an aqueous solution containing carbon dioxide gas instead of carboxylic acid improves melt stability and long-run workability of the obtained EVOH resin.

EVOH is obtained by saponifying an ethylene-vinyl ester copolymer in a third invention, and a composition and a producing process thereof are the same as described in a first invention. With regard to EVOH after saponifying, an alcohol solution or a water/alcohol mixed solution thereof may be precipitated in water or a water/alcohol solution and cut for pelletizing, or may be pelletized by the same process as the steps 1 and 2 of a first invention. EVOH can be contacted with an aqueous solution containing carbon dioxide gas in a molten state without pelletizing; however, EVOH pellets are preferably contacted with an aqueous solution containing carbon dioxide gas.

It is also preferable that the above-mentioned aqueous solution containing carbon dioxide gas further contains at least one kind of additive selected from the group consisting of boron compound, phosphoric acid compound, alkali metal salt and alkaline earth metal salt. Thus, various effects of adding these kinds of additives can be obtained. Kinds, adding processes or added amounts of these additives are the same as described in a first invention. However, it is preferable that carboxylic acid is not contained for producing an effect of a third invention such that carboxylic acid is not volatilized in the working environment and peripheral environment, which third invention differs in this point from a first invention.

EVOH contacted with an aqueous solution containing carbon dioxide gas is melt-kneaded in an extruder. Then, EVOH may be previously dried and supplied to an extruder or may be supplied to an extruder without drying. A process of melt-kneading is the same as described in the step 4 of a first invention. Then, at least one kind of additive selected from the group consisting of boron compound, phosphoric acid compound, alkali metal salt and alkaline earth metal salt is also preferably added in an extruder; however, it is preferable that carboxylic acid is not added.

After melt-kneading, EVOH discharged from an extruder is preferably cut to obtain EVOH pellets. A process of pelletizing in this case is the same as described in the step 5 of a first invention.

The uses of the obtained EVOH pellets are the same as described in a first invention.

Figure 1:
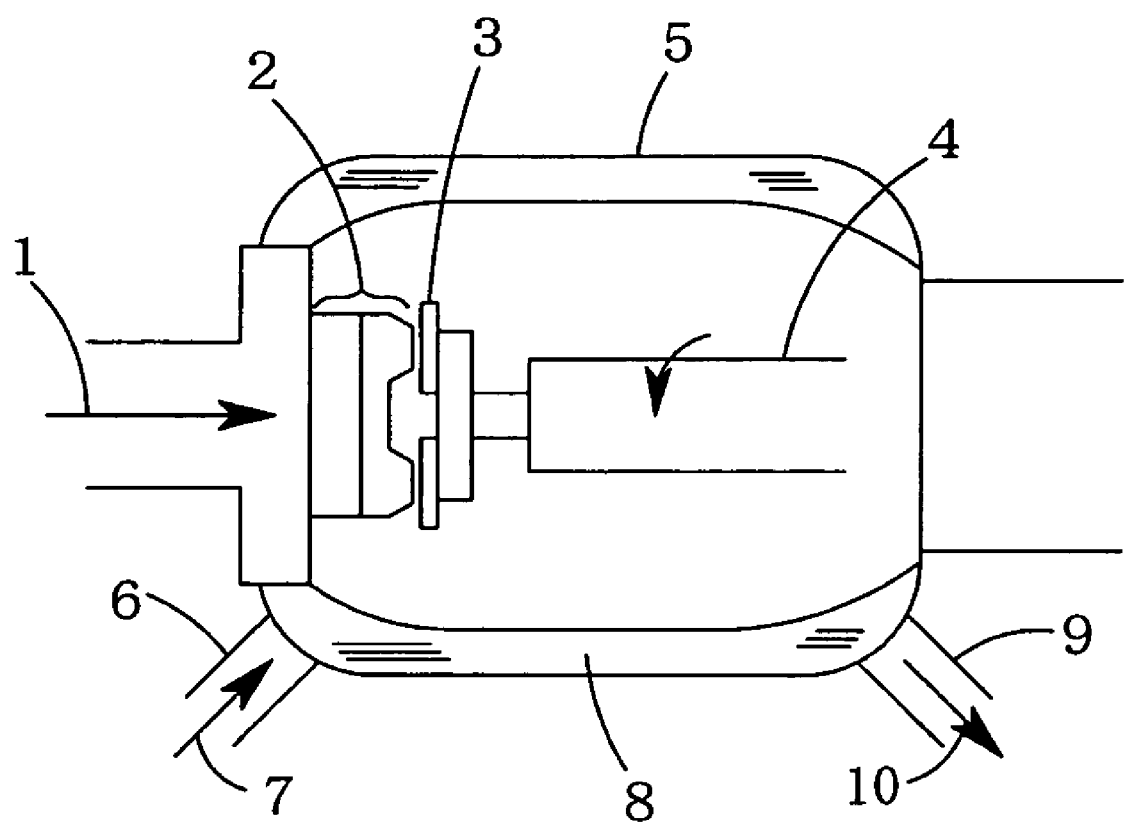
FIG. 1 is a view showing an example of the constitution of a hot cutter to be employed in the present invention.

The description of numerical references in FIGS. is as follows:

| | |
|---|---|
| 1 | feed opening of an EVOH hydrous composition |
| 2 | die |
| 3 | rotary blade |
| 4 | rotation axis |
| 5 | cutter box |
| 6 | cooling water feed opening |
| 7 | cooling water |
| 8 | water screen |
| 9 | pellets take-out port |
| 10 | cooling water and pellets |
| 11 | plate tower |
| 12 | EVOH solution supply piping |
| 13 | water vapor supply piping |
| 14 | gas emission piping |
| 15 | condenser |
| 16 | hydrous composition take-out piping |
| 17 | kneader |
| 18 | liquid exhaust slot |
| 19 | hot cutter |
| 20 | washing vessel |
| 21 | acid treatment vessel |
| 22, 23 | hot-air dryer |
| 24 | twin screw extruder |
| 25 | pellets feeding hopper |
| 26 | vent port |
| 27 | dies |
| 28 | additive feed opening |

BEST MODE FOR CARRYING OUT THE INVENTION

The present invention is further detailed hereinafter by examples and is not limited thereto. "%" and "part" are hereinafter based on weight unless otherwise specified. Any water for use is ion exchange water.

(1) Intrinsic Viscosity 0.20 g of dry EVOH pellets as a sample was precisely weighed and dissolved in 40 mL of hydrous phenol (water/phenol=15/85 weight %) at a temperature of 60° C. for 4 hours while heated, and then measured at a temperature of 30° C. by an Ostwald viscometer (t0=90 seconds) to calculate intrinsic (limiting) viscosity [η] by the following formula.

$$[\eta]=(2\times(\eta sp-1n\eta rel))^{1/2}/C \ (1/g)$$

ηsp=t/t0−1 (specific viscosity)
ηrel=t/t0 (relative viscosity)
C: EVOH concentration (g/l)
t0: the time when blank (hydrous phenol) passes through the viscometer
t: the time when a hydrous phenol solution in which a sample was dissolved passes through the viscometer (2) Measurement of the Water Content of EVOH Pellets The water content of EVOH pellets was measured on the conditions of drying temperature of 180° C., drying time of 20 minutes and sample amount of approximately 10 g by using a halogen water content analyzer ("HR73", manufactured by METTLER-TOLEDO International Inc.).

(3) Quantitative Determination of Alkali Metal Salt 10 g of powders of dry EVOH pellets, which were ground to a particle diameter of 1 mm or less by freeze grinding, and 50 mL of 0.01 N-hydrochloric acid aqueous solution were projected into a 100 mL-Erlenmeyer flask with a ground stopper, which flask was mounted with a cooling condenser to heat and extract while stirring at a temperature of 95° C. for 10 hours. 2 mL of the extracted liquid obtained was diluted with 8 mL of ion exchange water. The above-mentioned extracted liquid diluted was quantitatively analyzed by using ion chromatography ("IC7000", manufactured by YOKOGAWA ELECTRIC CORPORATION) to determine the amount of Na and K ions. Calibration curves drawn by using each of a sodium chloride aqueous solution and a potassium chloride aqueous solution were used for determining the amount thereof. The amount of alkali metal salt contained in dry EVOH pellets was obtained in terms of metallic element from the amount thus obtained of Na and K ions.

Ion Chromatography Measurement Conditions:
Column: ICS-C25 manufactured by YOKOGAWA ELECTRIC CORPORATION
Eluant: an aqueous solution containing 5.0 mM-tartaric acid and 1.0 mM-2,6-pyridinedicarboxylic acid
Measurement temperature: 40° C.
Rate of flow of eluant: 1 mL/min
Sample feeding amount: 50 μL (4) Quantitative Determination of Carboxylate Radical (C1) to be Extracted Through an Immersion Treatment in Water at a Temperature of 95° C. for 10 Hours Dry EVOH pellets were ground by freeze grinding. The ground EVOH obtained was sifted out through a sieve having a nominal size of 1 mm (in conformity to standard sieve specification JIS Z-8801). 10 g of EVOH powders through the above-mentioned sieve and 50 mL of ion exchange water were projected into a 100 mL-Erlenmeyer flask with a ground stopper, which flask was mounted with a cooling condenser to extract while stirring at a temperature of 95° C. for 10 hours. 2 mL of the extracted liquid obtained was diluted with 8 mL of ion exchange water. The above-mentioned extracted liquid diluted was quantitatively analyzed by using ion chromatography ("IC7000", manufactured by YOKOGAWA ELECTRIC CORPORATION) to determine the amount of carboxylic acid (acetic acid) ion and obtain carboxylate radical (C1). A calibration curve drawn by using an acetic acid aqueous solution was used for determining the amount thereof.

Ion Chromatography Measurement Conditions:
Column: SCS5-252 manufactured by YOKOGAWA ELECTRIC CORPORATION
Eluant: 0.1%-phosphoric acid aqueous solution
Measurement temperature: 40° C.
Rate of flow of eluant: 1 mL/min
Sample feeding amount: 50 μL (5) Quantitative Determination of Carboxylate Radical (C2) to be Extracted Through an Immersion Treatment in 0.05 N-Sodium Hydroxide Aqueous Solution at a Temperature of 95° C. for 10 Hours Dry EVOH pellets were ground by freeze grinding. The ground EVOH obtained was sifted out through a sieve having a nominal size of 1 mm (in conformity to standard sieve specification JIS Z-8801). 10 g of EVOH powders through the above-mentioned sieve and 50 mL of 0.05 N-sodium hydroxide aqueous solution were projected into a 100 mL-Erlenmeyer flask with a ground stopper, which flask was mounted with a cooling condenser to heat and extract while stirring at a temperature of 95° C. for 10 hours. 7 mL of ion exchange water was added to 2 mL of the extracted liquid obtained for dilution, to which 1 mL of 0.1 N-phosphoric acid aqueous solution was further added to prepare sample liquid for analysis. The above-mentioned extracted liquid diluted was quantitatively analyzed by using ion chromatography ("IC7000", manufactured by YOKOGAWA ELECTRIC CORPORATION) to determine the amount of carboxylic acid (acetic acid) ion and obtain carboxylate radical (C2). A calibration curve drawn by sample liquid for a calibration curve prepared by adding 7 mL of ion exchange water to 2 mL of a solution in which acetic acid was diluted with 0.05 N-sodium hydroxide aqueous solution and further adding 1 mL of 0.1 N-phosphoric acid aqueous solution thereto was used for determining the amount thereof.

Ion Chromatography Measurement Conditions:
Column: SCS5-252 manufactured by YOKOGAWA ELECTRIC CORPORATION
Eluant: 0.1%-phosphoric acid aqueous solution
Measurement temperature: 40° C.
Rate of flow of eluant: 1 mL/min
Sample feeding amount: 50 μL (6) Quantitative Determination of Boron Compound 50 mg of dry EVOH pellets as a sample was completely burned by an oxygen-flask combustion method, and the obtained combustion ash was dissolved in 10 mL of 1 mol/L-nitric acid aqueous solution. The content of boron compound was obtained in terms of boron element by using the above-mentioned solution through high-frequency plasma emission spectroscopy ("IRIS AP", an ICP emission spectral analyzer manufactured by Nippon Jarrell-Ash Co., Ltd.).

(7) Content (D1) of Phosphate Radical

Dry EVOH pellets or a monolayer film were ground by freeze grinding. The ground EVOH obtained was sifted out through a sieve having a nominal size of 1 mm (in conformity to standard sieve specification JIS Z-8801). 10 g of EVOH powders through the above-mentioned sieve and 50 mL of 0.01 N-hydrochloric acid aqueous solution were projected into a 100 mL-Erlenmeyer flask with a ground stopper, which flask was mounted with a cooling condenser to extract while stirring at a temperature of 95° C. for 4 hours. The obtained extracted liquid was quantitatively analyzed by using ion chromatography ("IC7000", manufactured by YOKOGAWA ELECTRIC CORPORATION) to determine the amount of phosphoric acid ion and obtain the content (D1: μmol/g) of phosphate radical. A calibration curve drawn by using a sodium dihydrogen phosphate aqueous solution was used for determining the amount thereof.

Ion Chromatography Measurement Conditions:
Column: ICS-A23 manufactured by YOKOGAWA ELECTRIC CORPORATION
Eluant: an aqueous solution containing 2.5 mM-sodium carbonate and 1.0 mM-sodium hydrogen carbonate
Measurement temperature: 40° C.
Sample feeding amount: 50 μL (8) Content (D2) of Phosphorus Element 50 mg of a monolayer film after melt-molding was completely burned by an oxygen-flask combustion method, and the obtained combustion ash was dissolved in 10 mL of 1 mol/L-nitric acid aqueous solution. The content (t: μmol/g) of phosphorus element was obtained by using the solution through high-frequency plasma emission spectroscopy ("IRIS AP", an ICP emission spectral analyzer manufactured by Nippon Jarrell-Ash Co., Ltd.).

(9) Monolayer Film Forming Test

The obtained dry EVOH pellets was subjected to monolayer film formation by using a 20 mm-extruder (D (mm)=20, L/D=20, compression ratio=2.0, screw: full-flighted, ("D2020", manufactured by TOYO SEIKI SEISAKU-SHO, LTD.) on the following conditions to obtain a monolayer film.

Extrusion temperature: C1/C2/C3/Die=175/200/220/220° C.
Number of revolutions of screw: 40 rpm
Discharge amount: 1.3 kg/hr
Take-up roll temperature: 80° C.
Take-up roll rate: 3.1 m/min
Film thickness: 20 μm (9-a) Yellowing Resistance The monolayer film produced by the above-mentioned process was rolled up on a paper tube to determine degree of colouring on an edge face of the film with the unaided eye in the following manner.

Determination: Standard
A: no yellowing
B: somewhat yellowing
C: yellowing (9-b) 72-hr Long-run Workability Films in 72 hours after starting monolayer film formation were sampled to count gel-like hard spots in the films (approximately 100 μm or more, which were visible to the unaided eye).

The number of the hard spots was converted into the number per 1.0 m² to determine in the following manner.

Determination: Standard
A: less than 20
B: 20 or more and less than 40
C: 40 or more (9-c) 96-hr Long-run Workability Films in 96 hours after starting monolayer film formation were sampled to count gel-like hard spots in the films (approximately 100 μm or more, which were visible to the unaided eye).

The number of the hard spots was converted into the number per 1.0 m² to determine in the following manner.
Determination: Standard
A: less than 20
B: 20 or more and less than 40
C: 40 or more (9-d) 120-hr Long-run Workability Films in 120 hours after starting monolayer film formation were sampled to count gel-like hard spots in the films (approximately 100 μm or more, which were visible to the unaided eye).

The number of the hard spots was converted into the number per 1.0 m² to determine in the following manner.
Determination: Standard
A: less than 20
B: 20 or more and less than 40
C: 40 or more

EXAMPLE 1

Figure 2:
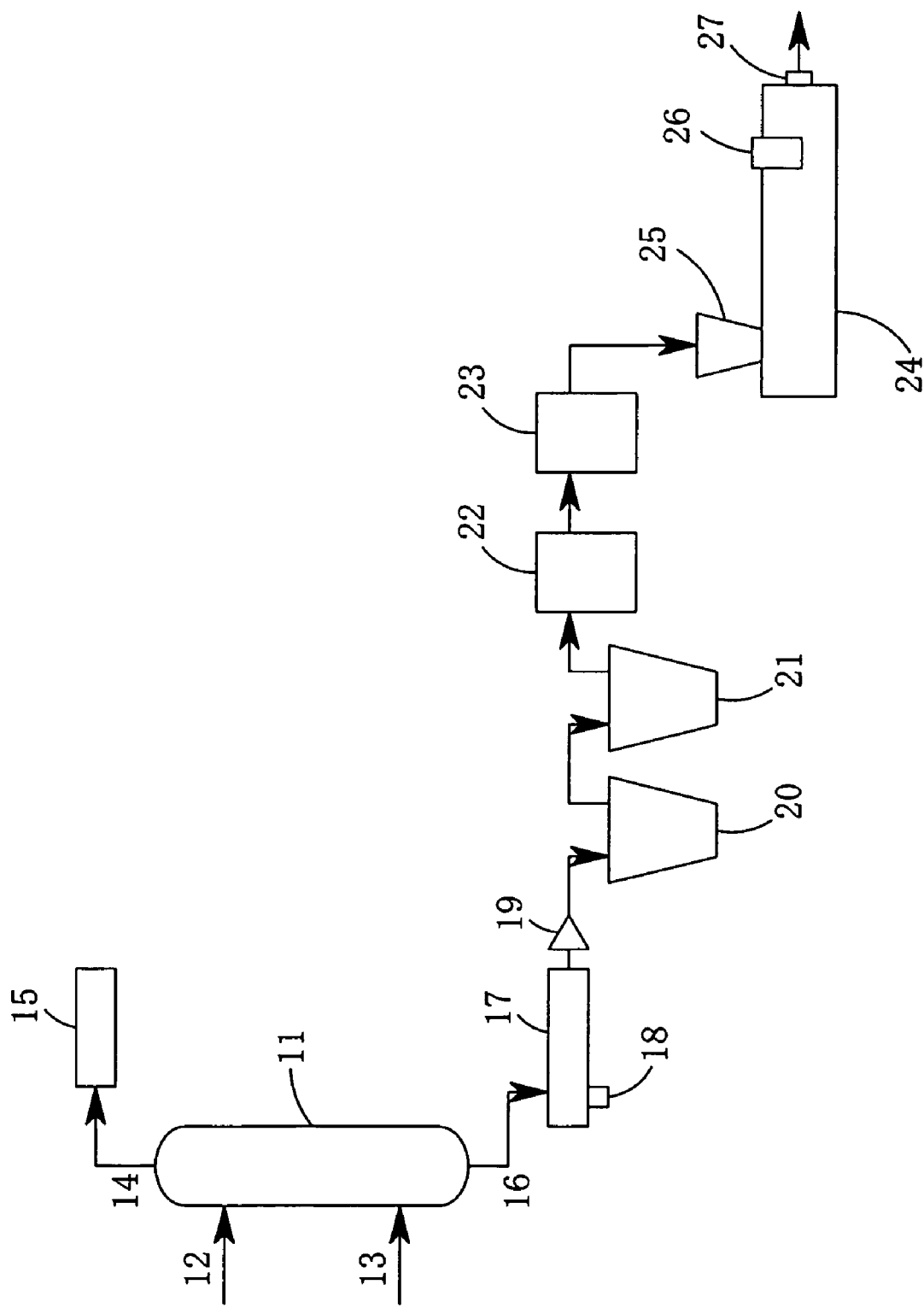
FIG. 2 is a schematic view of the steps of Example 1.

FIG. 2 schematically shows the steps. An EVOH solution containing 100 parts by weight of methanol, 50 parts by weight of water and 2 parts by weight of sodium acetate in terms of sodium with respect to 100 parts by weight of EVOH (intrinsic viscosity: 0.111 L/g) having an ethylene content of 32 mol % and a degree of saponification of 99.98 mol % or more (calculated by NMR method) was continuously supplied to the top plate of a plate tower 11 having a tower diameter of 0.3 m and a number of plates of 10 through an EVOH solution supply piping 12 at a rate of 52 kg/hr, and water vapor was blown into the bottom plate of the plate tower through a water vapor supply piping 13 at a rate of 86 kg/hr, and then the EVOH solution and water vapor were countercurrently contacted in the plate tower. The temperature in the tower was 130° C. and the pressure in the tower was 3 kg/cm². Methanol vapor and water vapor were distilled out of the top of the plate tower through a gas emission piping 14, condensed in a condenser 15 and recovered as a methanol aqueous solution. An EVOH hydrous composition was continuously drawn out of the bottom of the plate tower through a hydrous composition exhaust piping 16. This EVOH hydrous composition contained 0.05 parts by weight of methanol, 105 parts by weight of water and 2 parts by weight of sodium acetate in terms of sodium with respect to 100 parts by weight of EVOH.

Next, this EVOH hydrous composition was supplied to a kneader 17 with a bore of 50 mm and a length of 660 mm (L/D=13.2) having a liquid exhaust slot 18 at a rate of 41 kg/hr. The number of revolutions of the screw was 100 rpm. The EVOH hydrous composition obtained from a discharge slot contained 0.03 parts by weight of methanol, 48 parts by weight of water and 1.2 parts by weight of sodium acetate in terms of sodium with respect to 100 parts by weight of EVOH, and the temperature thereof was 118° C. Subsequently, this EVOH hydrous composition was extruded from a die having six holes with a hole diameter of 3 mm and cut by a hot cutter 19 having four blades at a distance of 0.05 mm from the die to obtain hydrous pellets. The number of revolutions of the cutter blade was 1200 rpm.

A process was repeated twice such that 3 kg of hydrous pellets thus obtained and 40 L of ion exchange water were charged into a plastic wash vessel 20 having a height of 470 mm and an open diameter of 420 mm, washed while stirred at a temperature of 25° C. for 2 hours and dewatered. Next, a process was repeated twice such that 40 L of 1 g/L-acetic acid aqueous solution was added to 3 kg of hydrous pellets, washed while stirred at a temperature of 25° C. for 2 hours and dewatered. In addition, a process was repeated six times such that 40 L of ion exchange water was added to 3 kg of hydrous pellets, washed while stirred at a temperature of 25° C. for 2 hours and dewatered. The conductance of a washing liquid after performing the sixth-time washing was measured by CM-30ET manufactured by METER, and consequently the conductance of the above-mentioned washing liquid was 3 μS/cm and the water content of the obtained hydrous pellets was 32 weight %.

Next, 40 L of ion exchange water was charged into a plastic acid treatment vessel 21 having a height of 470 mm and an open diameter of 420 mm. A silicon tube (an inside diameter of 7 mm and an outside diameter of 10 mm) was inserted into the ion exchange water in the above-mentioned vessel, and carbon dioxide gas was blown thereinto while bubbled for 0.5 hour at a rate of 8 L/min. The carbon dioxide gas was supplied by using a carbon dioxide gas cylinder (a liquefied carbon dioxide gas of 30 kg, manufactured by NIPPON TANSAN COMPANY, LIMITED) and a flow meter ("Model RK-1600R", manufactured by KOFLOC). 8.0 g of potassium carbonate was dissolved in the water into which the above-mentioned carbon dioxide gas was blown, and carbon dioxide gas was further blown for 1 hour at a rate of 8 L/min. The content of potassium carbonate in the above-mentioned treatment solution was 0.2 g/L. The pH of the above-mentioned treatment solution after blowing the carbon dioxide gas for 1 hour thereinto measured 5.2 by using a pH-meter ("MA235, manufactured by METTLER-TOLEDO K.K.").

Next, 3 kg of the above-mentioned hydrous pellets was projected into the above-mentioned treatment solution, and then immersed and stirred at a temperature of 25° C. for 4 hours while blowing carbon dioxide gas at a blow rate of 8 L/min. When the pH of the above-mentioned treatment solution was measured every hour during a period from the start of the treatment to the end thereof, the pH of the above-mentioned treatment solution was 5.2 with no fluctuations at each point of time for measuring. Thus, it was presumed that the carbon dioxide gas was dissolved in an approximately saturated state. Thereafter, the obtained pellets were immediately dewatered, dried by a still-standing type hot-air dryer 22 ("SP-100 type hot-air dryer", manufactured by ASAHI KAGAKU CO., LTD.) at a temperature of 65° C. for 1 hour and subsequently dried by a still-standing type hot-air dryer 23 ("SPHH-401 type hot-air dryer, manufactured by TABAI ESPEC CORP.") at a temperature of 80° C. for 40 minutes. The water content of the obtained hydrous pellets was 4.5%.

The obtained hydrous pellets were continuously supplied to a twin screw extruder 24 through a hopper 25, melt-kneaded and discharged from a die 27 while degassing by a vacuum pump through a vent port 26 provided at the location of a cylinder No. 4 (C4) of the extruder. Nitrogen was continuously supplied to the hopper 25 during the operation of the twin screw extruder 24 to allow an atmosphere in the hopper 25 to be always filled with nitrogen. The conditions of melt-kneading are as follows:

Specifications of a twin screw extruder (manufactured by TOYO SEIKI SEISAKU-SHO, LTD.)
Model: a twin screw extruder
L/D: 25
Bore diameter: 26 mmφ
Screw: same direction full engaging type
Number of die holes: 2 holes (3 mmφ)
Conditions of Kneading
Number of revolutions: 150 rpm Extrusion temperature: C1/C2/C3/C4/C5/Die=150/210/210/210/210/210° C.

Discharge amount: 2.0 kg/hr

Vent decompression: −0.1 MPa (gage pressure)

EVOH in a strand state discharged from the die 27 was led into a water bath filled with water at a temperature of 30° C. immediately after being discharged, and contacted with water for only approximately 1 second for cooling. Thereafter, EVOH was pulled up in the air by approximately 1 m while led by a guide roller, and cut by a strand cutter. The size of the obtained pellets was approximately 2 mm in diameter and approximately 3 mm in length. The contact time with water was extremely short, so that water did not adhere to a surface of the pellets and the water content thereof was 0.13 weight %. It was, therefore, not necessary to perform drying treatment. Alkali metal salt contained in the obtained pellets was potassium salt and the content of alkali metal salt was 61 ppm (1.6 μmol/g) in terms of metallic element. Carboxylate radical (C1) was 0 μmol/g and carboxylate radical (C2) was 0.6 μmol/g in the content.

The obtained pellets were used for forming a monolayer film in accordance with the above-mentioned process, and the test of yellowing resistance and long-run workability of the monolayer film were performed. Any evaluation of yellowing resistance, 72-hr long-run workability and 96-hr long-run workability was "A" with regard to EVOH of Example 1. Table 1, Table 2 and Table 3 show the formulation of an aqueous solution in which EVOH hydrous composition pellets were immersed, the composition of the obtained dry EVOH pellets and the evaluation thereof, respectively.

Figure 4:
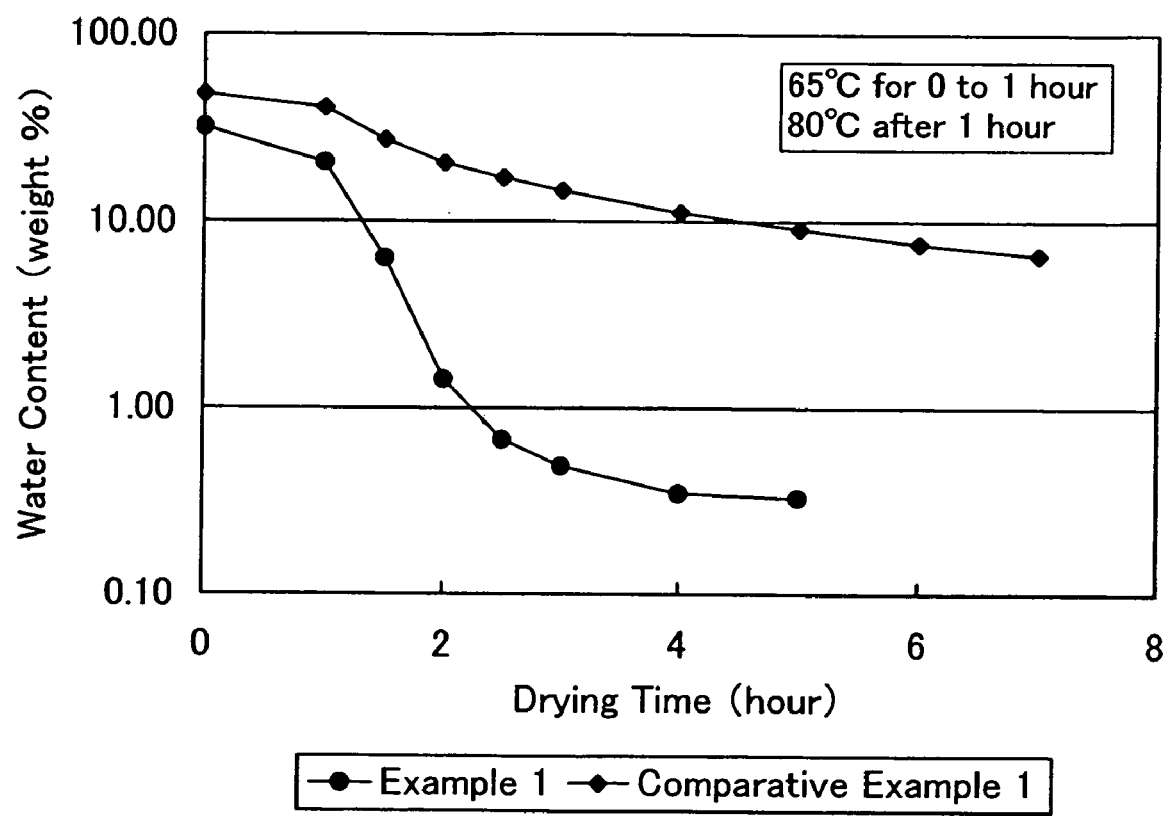
FIG. 4 is a drying curve of EVOH hydrous composition pellets of Example 1 and Comparative Example 1.

FIG. 4 shows a drying curve of EVOH hydrous composition pellets obtained by cutting in the step 2 of Example 1 and EVOH hydrous composition pellets (used in Comparative Example 1) obtained by precipitating an EVOH solution in a strand state for cutting. In this FIG., drying time was plotted on a horizontal axis and a logarithm of water content on a vertical axis. The drying was performed by a still-standing type hot-air dryer ("SP-100 type hot-air dryer", manufactured by ASAHI KAGAKU CO., LTD.) at a temperature of 65° C. for 1 hour after starting to dry and subsequently by a still-standing type hot-air dryer ("SPHH-401 type hot-air dryer", manufactured by TABAI ESPEC CORP.) at a temperature of 80° C. to measure the water content every 1 hour. It is understood that EVOH hydrous composition pellets of the present invention is high in drying rate as compared with EVOH hydrous composition pellets obtained by precipitating an EVOH solution in a strand state for cutting, and allows the content to be promptly decreased also in drying at low temperatures.

EXAMPLE 2

Dry EVOH pellets were produced and evaluated in the same manner as Example 1 except for modifying the composition of a treatment solution containing carbon dioxide gas, in which hydrous pellets after washing were immersed, as shown in Table 1. The water content of pellets after drying in the step 3 was 4.5 weight % and the content of pellets after cutting in the step 5 was 0.12 weight %. Table 2 and Table 3 show the composition of the dry EVOH pellets and the evaluation thereof, respectively.

EXAMPLE 3

Dry EVOH pellets were produced and evaluated in the same manner as Example 1 except for modifying the composition of a treatment solution containing carbon dioxide gas, in which hydrous pellets after washing were immersed, as shown in Table 1 and modifying the drying conditions before pelletizing by a twin screw extruder into the drying by a still-standing type hot-air dryer 22 ("SP-100 type hot-air dryer", manufactured by ASAHI KAGAKU CO., LTD.) at a temperature of 65° C. for 1 hour and subsequently the drying by a still-standing type hot-air dryer 23 ("SPHH-401 type hot-air dryer", manufactured by TABAI ESPEC CORP.) at a temperature of 80° C. for 1 hour and 40 minutes. The water content of pellets after drying in the step 3 was 0.6 weight % and the water content of pellets after cutting in the step 5 was 0.14 weight %. Table 2 and Table 3 show the composition of the dry EVOH pellets and the evaluation thereof, respectively.

EXAMPLE 4

Figure 3:
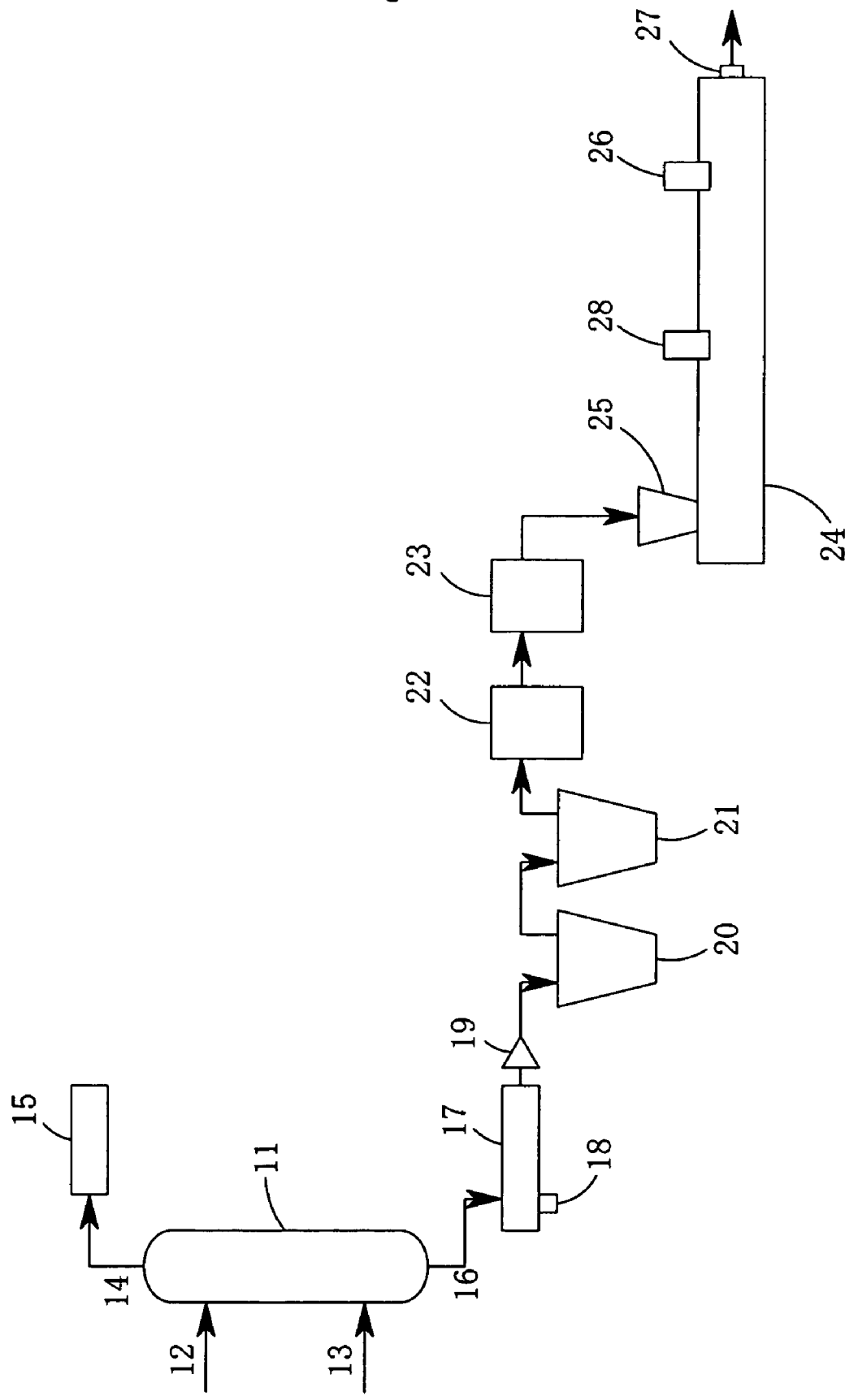
FIG. 3 is a schematic view of the steps of Example 4.

FIG. 3 schematically shows the steps. An EVOH solution containing 100 parts by weight of methanol, 50 parts by weight of water and 2 parts by weight of sodium acetate in terms of sodium with respect to 100 parts by weight of EVOH (intrinsic viscosity: 0.085 L/g) having an ethylene content of 32 mol % and a degree of saponification of 99.98 mol % or more (calculated by NMR method) was continuously supplied to the top plate of a plate tower 11 having a tower diameter of 0.3 m and a number of plates of 10 through an EVOH solution supply piping 12 at a rate of 52 kg/hr, and water vapor was blown into the bottom plate of the plate tower through a water vapor supply piping 13 at a rate of 86 kg/hr, and then the EVOH solution and water vapor were counter-currently contacted in the plate tower. The temperature in the tower was 130° C. and the pressure in the tower was 3 kg/cm$^2$. Methanol vapor and water vapor were distilled out of the top of the plate tower through a gas emission piping 14, condensed in a condenser 15 and recovered as a methanol aqueous solution. An EVOH hydrous composition was continuously drawn out of the bottom of the plate tower through a hydrous composition exhaust piping 16. This EVOH hydrous composition contained 0.05 parts by weight of methanol, 105 parts by weight of water and 2 parts by weight of sodium acetate in terms of sodium with respect to 100 parts by weight of EVOH.

Next, this EVOH hydrous composition was supplied to a kneader 17 with a bore diameter of 50 mm and a length of 660 mm (L/D=13.2) having a liquid exhaust slot 18 at a rate of 41 kg/hr. The number of revolutions of the screw was 100 rpm. The EVOH hydrous composition obtained from a discharge slot contained 0.03 parts by weight of methanol, 48 parts by weight of water and 1.2 parts by weight of sodium acetate in terms of sodium with respect to 100 parts by weight of EVOH, and the temperature thereof was 104° C. Subsequently, this EVOH hydrous composition was extruded from a die having six holes with a hole diameter of 3 mm and cut by a hot cutter 19 having four blades at a distance of 0.02 mm from the die to obtain hydrous pellets. The number of revolutions of the cutter blade was 1200 rpm.

A process was repeated twice such that 15 kg of hydrous pellets thus obtained and 140 L of ion exchange water were charged into a stainless-steel wash vessel 20 having a height of 880 mm and an open diameter of 590 mm, washed while stirred at a temperature of 25° C. for 2 hours and dewatered. Next, a process was repeated twice such that 140 L of 1 g/L-acetic acid aqueous solution was added to 15 kg of hydrous pellets, washed while stirred at a temperature of 25° C. for 2 hours and dewatered. In addition, a process was repeated six times such that 140 L of ion exchange water was added to 15 kg of hydrous pellets, washed while stirred at a temperature of 25° C. for 2 hours and dewatered. The conductance of a washing liquid after performing the sixth-time washing was measured by CM-30ET manufactured by METER, and consequently the conductance of the above-mentioned washing liquid was 3 μS/cm and the water content of the obtained hydrous pellets was 32 weight %.

140 L of ion exchange water was charged into a stainless-steel acid treatment vessel 21 having a height of 880 mm and an open diameter of 590 mm, and 1.4 g of potassium hydrogen carbonate was dissolved therein. The content of potassium hydrogen carbonate in a treatment solution was 0.01 g/L. Next, 2.5 kg of dry ice and 15 kg of the above-mentioned hydrous pellets were projected into the above-mentioned treatment solution, and then immersed and stirred for 4 hours. 2.5 kg of dry ice was additionally projected thereinto 2 hours after the start of the treatment, and the pH of the treatment solution was retained at 4.5 or less until the end of the treatment. Thereafter, the obtained pellets were immediately dewatered, dried by a still-standing type hot-air dryer 22 ("SP-100 type hot-air dryer", manufactured by ASAHI KAGAKU CO., LTD.) at a temperature of 65° C. for 1 hour and subsequently dried by a still-standing type hot-air dryer 23 ("SPHH-401 type hot-air dryer, manufactured by TABAI ESPEC CORP.") at a temperature of 80° C. for 25 minutes. The water content of the obtained hydrous pellets was 9.9%.

The obtained hydrous pellets were continuously supplied to a twin screw extruder 24 through a hopper 25. The discharged amount of EVOH per hour was 10 kg/hr. A treatment solution containing boric acid, potassium hydrogen carbonate and dipotassium hydrogen phosphate was added through an additive feed opening 28 provided at the location of a cylinder No. 7 (C7) of the extruder. The treatment solution was an aqueous solution containing 4.2 g/L of boric acid, 0.57 g/L of potassium hydrogen carbonate and 0.81 g/L of dipotassium hydrogen phosphate, and the projected amount thereof per hour was 2.5 L/hr. It was discharged from a die 27 while degassing by a vacuum pump through a vent port 26 provided at the location of a cylinder No. 11 (C11) of the extruder. Nitrogen was continuously supplied to the hopper 25 during the operation of the twin screw extruder 24 to allow an atmosphere in the hopper 25 to be always filled with nitrogen.

The Specifications of a twin screw extruder (manufactured by THE JAPAN STEEL WORKS, LTD.) and the conditions of melt-kneading are as follows:
 Model: a twin screw extruder
 L/D: 45.5
 Bore: 47 mmφ
 Screw: same direction full engaging type
 Number of revolutions: 200 rpm
 Extrusion temperature: C1/C2/C3/C4/C5/C6/C7/C8/C9/C10/C11/C12/C13/Die=80/80/80/160/160/160/160/200/200/200/220/220/220/220° C.
 Discharge amount: 10 kg/hr
 Vent decompression: −0.1 MPa (gage pressure)
 Number of die holes: 5 holes (φ3 mm)

EVOH in a strand state discharged from the die 27 was led into a water bath filled with water at a temperature of 30° C. immediately after being discharged, and contacted with water for only approximately 1 second for cooling. Thereafter, EVOH was pulled up in the air by approximately 5 m while led by a guide roller, and cut by a strand cutter. The size of the obtained pellets was approximately 2 mm in diameter and approximately 3 mm in length. The contact time with water was extremely short, so that water did not adhere to a surface of the pellets and the water content thereof was 0.2 weight %. It was, therefore, not necessary to perform drying treatment.

Alkali metal salt contained in the obtained pellets was potassium salt and the content of alkali metal salt was 131 ppm (3.4 μmol/g) in terms of metallic element. Carboxylate radical (C1) was 0 μmol/g and carboxylate radical (C2) was 0.6 μmol/g in the content. The content of boron compound was 150 ppm (14 μmol/g) in terms of boron element, and the content (D1) of phosphate radical was 102 ppm (1.1 μmol/g).

The obtained pellets were used for forming a monolayer film in accordance with the above-mentioned process, which film was subjected to the test of yellowing resistance and long-run workability. Any evaluation of yellowing resistance, 72-hr long-run workability and 96-hr long-run workability was determination A with regard to EVOH of the present Example. The content (D1) of phosphate radical in the obtained monolayer film was 0.1 μmol/g and the content (D2) of phosphorus element was 1.1 μmol/g. Table 2 and Table 3 show the composition of the obtained dry EVOH pellets and monolayer film and the evaluation thereof, respectively.

COMPARATIVE EXAMPLE 1

20 parts by weight of water was further added to an EVOH solution containing 100 parts by weight of methanol, 50 parts by weight of water and 2 parts by weight of sodium acetate in terms of sodium with respect to 100 parts by weight of EVOH (intrinsic viscosity: 0.111 L/g) having an ethylene content of 32 mol % and a degree of saponification of 99.98 mol % (calculated by NMR method), and thereafter dissolved at a temperature of 80° C. The obtained EVOH solution was extruded from a metal plate having a circular opening with a diameter of 3.5 mm into a water/methanol mixed solution (weight ratio: water/methanol=9/1) at a temperature of 5° C., and precipitated in a strand state and cut to thereby obtain hydrous pellets having a diameter of approximately 4 mm and a length of approximately 5 mm.

A process was repeated twice such that 3 kg of hydrous pellets thus obtained and 40 L of ion exchange water were charged into a plastic vessel having a height of 470 mm and an open diameter of 420 mm, washed while stirred at a temperature of 25° C. for 2 hours and dewatered. Next, a process was repeated twice such that 40 L of 1 g/L-acetic acid aqueous solution was added to 3 kg of hydrous pellets, washed while stirred at a temperature of 25° C. for 2 hours and dewatered. In addition, a process was repeated six times such that 40 L of ion exchange water was added to 3 kg of hydrous pellets, washed while stirred at a temperature of 25° C. for 2 hours and dewatered. The conductance of a washing liquid after performing the sixth-time washing was measured by CM-30ET manufactured by METER, and consequently the conductance of the above-mentioned washing liquid was 3 μS/cm and the water content of the obtained EVOH pellets was 48 weight %.

Next, 40 L of ion exchange water was charged into a plastic vessel having a height of 470 mm and an open diameter of 420 mm. A silicon tube (an inside diameter of 7 mm and an outside diameter of 10 mm) was inserted into the ion exchange water in the above-mentioned vessel, and carbon dioxide gas was blown thereinto while bubbled for 0.5 hour at a rate of 8 L/min. The carbon dioxide gas was supplied by using a carbon dioxide gas cylinder (a liquefied carbon dioxide gas of 30 kg, manufactured by NIPPON TANSAN COMPANY, LIMITED) and a flow meter ("Model RK-1600R", manufactured by KOFLOC). 2.4 g of potassium carbonate was dissolved in the water into which the above-mentioned carbon dioxide gas was blown, and carbon dioxide gas was further blown for 1 hour at a rate of 8 L/min. The content of potassium carbonate in the above-mentioned treatment solution was 0.06 g/L.

Next, 3 kg of the above-mentioned hydrous pellets was projected into the above-mentioned treatment solution, and then immersed and stirred at a temperature of 25° C. for 4 hours while blowing carbon dioxide gas at a blow rate of 8 L/min. Thereafter, the obtained hydrous pellets were immediately dewatered and subjected to hot-air drying ("SPHH-401 type hot-air dryer, manufactured by TABAI ESPEC CORP.") at a temperature of 80° C. for 3 hours and subsequently at a temperature of 107° C. for 24 hours to obtain dry pellets having a water content of 0.15%. The obtained dry pellets were variously evaluated in the same manner as Example 1. Alkali metal salt in the obtained dry EVOH pellets was potassium and the content of alkali metal salt was 62 ppm (1.6 μmol/g) in terms of metallic element. Table 1, Table 2 and Table 3 show the formulation of an aqueous solution in which EVOH hydrous composition pellets were immersed, the composition of the obtained dry EVOH pellets and the evaluation thereof, respectively. It is understood that high temperatures and a long time are required for drying up to the water content, which is approximately the same as Examples 1 to 4.

COMPARATIVE EXAMPLE 2

3 kg of hydrous pellets after washing, which were obtained in the same manner as Comparative Example 1, were immersed and stirred in a 40 L-aqueous solution containing 0.56 g/L of acetic acid and 0.6 g/L of sodium acetate. As a vessel, a plastic vessel having a height of 470 mm and an open diameter of 420 mm was used in the same manner as Example 1. Thereafter, the hydrous pellets were dewatered and subjected to hot-air drying ("SPHH-401 type hot-air dryer", manufactured by TABAI ESPEC CORP.) at a temperature of 80° C. for 3 hours and subsequently at a temperature of 107° C. for 24 hours to obtain dry EVOH pellets having a water content of 0.15%. The obtained dry pellets were variously evaluated in the same manner as Example 1. Table 1, Table 2 and Table 3 show the formulation of an aqueous solution in which EVOH hydrous composition pellets were immersed, the composition of the obtained dry EVOH pellets and the evaluation thereof, respectively. It is understood that high temperatures and a long time are required for drying up to the water content, which is approximately the same as Examples 1 to 4. It is also understood in the present Comparative Example, in which pellets were immersed in an aqueous solution containing acetic acid, that long-run workability in the monolayer film forming test is deteriorated as compared with Examples 1 to 4 and Comparative Example 1, in which pellets were immersed in an aqueous solution containing carbon dioxide gas instead of acetic acid.

TABLE 1

Formulation of Treatment Solution

|  | Blowing-in of Carbon Dioxide Gas | Acetic Acid | Sodium Carbonate | Potassium carbonate | Sodium Acetate | Water Content of Pellets |
|---|---|---|---|---|---|---|
| Example 1 | Performed | 0 g/L | 0 g/L | 0.2 g/L | 0 g/L | 32% |
| Example 2 | Performed | 0 g/L | 0.15 g/L | 0 g/L | 0 g/L | 32% |
| Example 3 | Performed | 0 g/L | 0 g/L | 0.2 g/L | 0 g/L | 32% |
| Comparative Example 1 | Performed | 0 g/L | 0 g/L | 0.06 g/L | 0 g/L | 48% |
| Comparative Example 2 | Not Performed | 0.56 g/L | 0 g/L | 0 g/L | 0.6 g/L | 48% |

TABLE 2

Composition of EVOH Resin Composition

|  | Degree of Saponification (mol %) (calculated by NMR) | Alkali Metal Salt (sodium) (μmol/g) | Alkali Metal Salt (potassium) (μmol/g) | Carboxylate Radical (C1) (μmol/g) | Carboxylate (Radical (C2) (μmol/g) | Boron Compound (μmol/g) | Content (D1) of Phosphate Radical (μmol/g) *1) | Content (D2) of Phosphorus Element (μmol/g) *1) |
|---|---|---|---|---|---|---|---|---|
| Example 1 | 99.98 or more | 0 | 1.6 | 0 | 0.6 | 0 | 0 | 0 |
| Example 2 | 99.98 or more | 1.6 | 0 | 0 | 0.6 | 0 | 0 | 0 |
| Example 3 | 99.98 or more | 0 | 1.6 | 0 | 0.6 | 0 | 0 | 0 |
| Example 4 | 99.98 or more | 0 | 3.4 | 0 | 0.6 | 14.0 | 0.1 | 1.1 |
| Comparative Example 1 | 99.98 or more | 0 | 1.6 | 0 | 0.6 | 0 | 0 | 0 |
| Comparative Example 2 | 99.98 or more | 5.8 | 0 | 6.9 | 7.7 | 0 | 0 | 0 |

*1) analyzing a monolayer film

TABLE 3

| | Monolayer Film Forming Test | | | | |
|---|---|---|---|---|---|
| | Yellowing Resistance | Long-run Workability (72 hr) | Long-run Workability (96 hr) | Long-run Workability (120 hr) | *1) Drying Time (Hr) |
| Example 1 | A | A | A | B | 1 Hour and 40 Minutes |
| Example 2 | A | A | A | B | 1 Hour and 40 Minutes |
| Example 3 | A | A | A | B | 2 Hours and 40 Minutes |
| Example 4 | A | A | A | A | 1 Hour and 40 Minutes |
| Comparative Example 1 | A | A | A | B | 27 Hours |
| Comparative Example 2 | A | B | C | C | 27 Hours |

*1) drying time: the total time for being projected into a dryer

Industrial Applicability

By a process for producing EVOH pellets of the present invention, alcohol can be efficiently removed without deteriorating the working environment and peripheral environment, water in the EVOH hydrous composition thus obtained can be efficiently removed, and pellets having less thermal degradation in removing water and a uniform shape can be obtained.

The invention claimed is:

1. A process for producing a pellet of an ethylene-vinyl alcohol copolymer, comprising:
   (1) introducing into a vessel an ethylene-vinylalcohol copolymer solution comprising 50 parts by weight or more of an alcohol having a boiling point of 100° C. or less with respect to 100 parts by weight of an ethylene-vinylalcohol copolymer, contacting the solution with water vapor in said vessel to let out said alcohol with water vapor and then letting out from said vessel an ethylene-vinylalcohol copolymer hydrous composition containing 0 to 10 parts by weight of said alcohol and 10 to 1000 parts by weight of water with respect to 100 parts by weight of the ethylene-vinylalcohol copolymer;
   (2) cutting the ethylene-vinylalcohol copolymer hydrous composition in a molten state let out from said vessel in (1), thereby obtaining ethylene-vinylalcohol copolymer hydrous composition pellets;
   (3) introducing the ethylene-vinylalcohol copolymer hydrous composition pellets obtained in (2) into a dryer to reduce a water content of the pellets;
   (4) melt-kneading the pellets having the water content from 0.1 to 4.5 wt. % reduced in (3), in an extruder; and
   (5) cutting the ethylene-vinylalcohol copolymer discharged from the extruder in (4), thereby obtaining the pellet of the ethylene-vinyl alcohol copolymer.

2. The process for producing a pellet of an ethylene-vinyl alcohol copolymer according to claim 1, wherein an ethylene content of said ethylene-vinylalcohol copolymer is 3 to 70 mol % and a degree of saponification thereof is 80 mol % or more.

3. The process for producing a pellet of an ethylene-vinyl alcohol copolymer according to claim 1, wherein said alcohol is methanol.

4. The process for producing a pellet of an ethylene-vinyl alcohol copolymer according to claim 1, wherein said ethylene-vinylalcohol copolymer solution is continuously introduced into a tower type vessel and contacted with water vapor in the vessel.

5. The process for producing a pellet of an ethylene-vinyl alcohol copolymer according to claim 4, wherein
   said ethylene-vinylalcohol copolymer solution is introduced from an upper part of the tower type vessel;
   water vapor is introduced from a lower part of the tower type vessel;
   said ethylene-vinylalcohol copolymer solution is counter-currently contacted with water vapor;
   thereafter said ethylene-vinylalcohol copolymer hydrous composition is let out from the lower part of the tower type vessel; and
   said alcohol is let out with water vapor from the upper part of the tower type vessel.

6. The process for producing a pellet of an ethylene-vinyl alcohol copolymer according to claim 1, wherein said pellets obtained by cutting in (2) are immersed in a washing liquid to remove a saponification catalyst residue and then supplied to said dryer of (3).

7. The process for producing a pellet of an ethylene-vinyl alcohol copolymer according to claim 1, wherein said pellets obtained by cutting in (2) are immersed in an aqueous solution containing at least one kind of additive selected from the group consisting of a carboxylic acid, boron compound, phosphoric acid compound, alkali metal salt and alkaline earth metal salt to add said additive to the pellets, and then supplied to said dryer of (3).

8. The process for producing a pellet of an ethylene-vinyl alcohol copolymer according to claim 1, wherein a temperature of the pellets in said dryer is from 40 to 150° C. in (3).

9. The process for producing a pellet of an ethylene-vinyl alcohol copolymer according to claim 1, wherein a water content of the pellets is reduced to 10 weight % or less in (3).

10. The process for producing a pellet of an ethylene-vinyl alcohol copolymer according to claim 1, wherein a water content of the ethylene-vinylalcohol copolymer discharged from the extruder after melt-kneading is 1 weight % or less in (4).

11. The process for producing a pellet of an ethylene-vinyl alcohol copolymer according to claim 1, wherein water is removed from a molten resin in said extruder in (4).

12. The process for producing a pellet of an ethylene-vinyl alcohol copolymer according to claim 1, wherein at least one kind of additive selected from the group consisting of a carboxylic acid, boron compound, phosphoric acid compound, alkali metal salt and alkaline earth metal salt is added in said extruder in (4).

13. The process for producing a pellet of an ethylene-vinyl alcohol copolymer according to claim 1, wherein
   said pellets obtained by cutting in (2) are immersed in an aqueous solution containing at least one kind of additive selected from the group consisting of a carboxylic acid, boron compound, phosphoric acid compound, alkali metal salt and alkaline earth metal salt to add said additive to the pellets, and then supplied to said dryer of (3); and
   at least one kind of additive selected from the group consisting of a carboxylic acid, boron compound, phosphoric acid compound, alkali metal salt and alkaline earth metal salt is added in said extruder in (4).

14. The process for producing a pellet of an ethylene-vinyl alcohol copolymer according to claim 1, wherein the ethylene-vinylalcohol copolymer discharged from the extruder is cut after cooling in (5).

15. The process for producing a pellet of an ethylene-vinyl alcohol copolymer according to claim 1, wherein a water content of the pellet is decreased by 0.1 weight % or more between a discharge from the dryer in (3) and a discharge from the extruder in (4).

* * * * *